(12) United States Patent
Landi

(10) Patent No.: US 12,473,722 B1
(45) Date of Patent: Nov. 18, 2025

(54) PREFABRICATED SEWAGE ASSEMBLY SYSTEM AND METHOD

(71) Applicant: Mauro Sergio Nigri Landi, Miami, FL (US)

(72) Inventor: Mauro Sergio Nigri Landi, Miami, FL (US)

(*) Notice: Subject to any disclaimer, the term of this patent is extended or adjusted under 35 U.S.C. 154(b) by 0 days.

(21) Appl. No.: 18/108,477

(22) Filed: Feb. 10, 2023

Related U.S. Application Data

(63) Continuation of application No. 18/107,809, filed on Feb. 9, 2023, which is a continuation of application No. 18/104,889, filed on Feb. 2, 2023.

(60) Provisional application No. 63/393,763, filed on Jul. 29, 2022.

(51) Int. Cl.
*E03C 1/122* (2006.01)
*E04B 2/56* (2006.01)

(52) U.S. Cl.
CPC ............... *E03C 1/122* (2013.01); *E04B 2/56* (2013.01)

(58) Field of Classification Search
CPC .................................. E03C 1/122; E04B 2/56
See application file for complete search history.

(56) References Cited

U.S. PATENT DOCUMENTS

| | | | |
|---|---|---|---|
| 1,999,925 A * | 4/1935 | Buzhardt | F16M 11/08 248/156 |
| 3,809,348 A * | 5/1974 | Di Laura | E03F 1/008 248/156 |
| 3,897,668 A | 8/1975 | McDonnell | |
| 4,397,127 A | 8/1983 | Mieyal | |
| 5,345,728 A * | 9/1994 | Sugda | E03C 1/122 52/220.8 |
| 5,433,046 A | 7/1995 | MacQuarrie et al. | |
| 5,685,121 A | 11/1997 | DeFrancesco et al. | |
| 5,685,508 A * | 11/1997 | Smith | F16L 3/18 248/55 |
| 5,713,176 A * | 2/1998 | Hunt | E04C 3/292 52/847 |
| 5,735,100 A | 4/1998 | Campbell | |
| 5,803,653 A | 9/1998 | Zuffetti | |
| 5,927,038 A | 7/1999 | Goldberg et al. | |
| 6,119,430 A | 9/2000 | Nicholls | |
| 6,592,093 B2 * | 7/2003 | Valentz | F16L 3/18 248/677 |
| 8,061,099 B2 | 11/2011 | Andrews | |
| 11,085,190 B1 * | 8/2021 | Farrington | E04D 13/00 |
| 11,674,307 B2 | 6/2023 | Khatri et al. | |
| 2005/0210813 A1 | 9/2005 | Surowiecki | |
| 2005/0257489 A1 | 11/2005 | Belanger | |

(Continued)

*Primary Examiner* — Patrick C Williams
(74) *Attorney, Agent, or Firm* — MALLOY & MALLOY PL

(57) ABSTRACT

A prefabricated sewage assembly system and method, including a plurality of base members; a plurality of adjustable brackets; a plurality of slots disposed on each of said adjustable brackets; a plurality of slot pins disposed within each of said slots; each of said slot pins structured to slide a slot distance via said slots; a plurality of pipe anchors correspondingly dimensioned and configured to receive and permit installation of a plurality of pipes; said plurality of pipes comprising a network of interconnected pipes and fittings; and said prefabricated sewage assembly system correspondingly dimensioned and configured to permit installation within a structure.

1 Claim, 19 Drawing Sheets

(56) References Cited

U.S. PATENT DOCUMENTS

| | | |
|---|---|---|
| 2012/0144774 A1 | 6/2012 | Andrews et al. |
| 2016/0131280 A1* | 5/2016 | Brown .................... B29C 65/48 |
| | | 29/525.11 |
| 2017/0342736 A1 | 11/2017 | Roshinsky et al. |
| 2020/0331694 A1* | 10/2020 | Grip .................... B65D 90/008 |
| 2021/0002894 A1 | 1/2021 | Van de Voorde |

* cited by examiner

PREFABRICATED SEWAGE ASSEMBLY SYSTEM AND METHOD

CLAIM OF PRIORITY

The present application is a Continuation patent application of and claims priority to a previously filed U.S. Non-Provisional patent application, namely, that having Ser. No. 18/107,809 and a filing date of Feb. 9, 2023; as well as a previously filed U.S. Non-Provisional patent application, namely, that having Ser. No. 18/104,889 and a filing date of Feb. 2, 2023; and further claims priority under 35 U.S.C. § 119 to U.S. provisional patent application having Ser. No. 63/393,763 and having a filing date of Jul. 29, 2022, which is explicitly incorporated herein by reference in its entirety.

BACKGROUND OF THE INVENTION

Field of the Invention

The present invention generally relates to an integrated wall and custom pallet system and method. More specifically, the present invention relates to a prefabricated wall frame assembly system for installation in a partially complete structure, and method for installing the same; a prefabricated wall frame assembly system storage and transportation housing system; and a prefabricated sewage assembly system and method for constructing the same.

Description of the Related Art

Today, there is a recognized and alarming housing crisis across the globe. With explosive demand and skyrocketing prices, there are simply not enough structures to accommodate our ever-growing population. Rates of homelessness and displaced individuals continue to rise while affordable housing becomes harder to find. Further, costs associated with constructing new housing and other structures are extremely high. This deters would-be builders from erecting new structures that could improve our collective quality of life by accommodating people's homes, businesses, and activity spaces.

In large part, the high price of construction is due to the costs associated with current systems and methods for constructing and installing walls in structures. Such present-day systems and methods are inefficient ones that consistently result in wasted time and materials, as well as inconsistent quality and extreme costs. Moreover, measuring and installing additional components to the wall, such as plumbing and electrical, are further challenges faced during the wall construction process that increase time, complexity, and expense.

Walls are traditionally built, piece-by-piece, on-site at a structure undergoing construction or renovations, is partially complete, and/or is being repaired. Today, the wall construction process begins with selecting a location for the wall and taking measurements. Relying upon these measurements, construction workers then hand cut the studs and tracks, which are components that comprise the support structure for the wall. After being measured and cut on-site, the studs and tracks are then each secured into place at the structure, one-by-one. Specifically, after positioning the tracks, workers have to insert the studs and screw them into the tracks, all by hand on-site.

Due to the chaos of the construction site coupled with the piecemeal nature of stud and track cutting and installation, present-day wall erection operations experience wasted time and materials, as well as many partially complete tasks. The piece-by-piece installation not only results in many half-completed walls, but also makes the coordination of work and inspections more difficult; this makes the quality of the project decrease and drags out the construction timeline. Additionally, the current systems and methods make it very hard to control and oversee the effective progress on a construction site.

Moreover, many workers are presently needed to build and erect each wall of a structure, including both structural and partition walls, which results in high labor expenses. Worker turnover on-site further contributes to the high variance in quality amongst a structure's walls, with different workers following their own subjective procedures in measuring, cutting, and installing each stud and track. This also contributes to wasted time and materials, some due to operator error, environmental distraction, and inadequate supervision on-site. Ultimately, the foregoing issues associated with current systems and methods for wall construction results in an overall high cost, quality issues, and a lengthy construction period.

As briefly discussed above, the construction and installation of other systems within the structure, such as mechanical, electrical, and plumbing (MEP) components, further contribute to the time, expense, difficulty, and waste that is experienced in the construction process, which includes wall erection and installation. For example, present day plumbing for sewage systems is a severe challenge in the wall installation process. Currently, sewage system measurements are taken before the pipes and fittings used are cut and connected on-site, piece-by-piece. Due to the inflexible nature of pipes and fittings, sewage systems are difficult to fit together and are a challenge to properly connect. On-site, these issues manifest as sewage systems with imprecise slopes for sewage to flow and insufficient connections between pipes. For example, because the construction site is a dirty environment exposed to the outdoor elements, glue often becomes contaminated with dirt and debris which affects the sealing process and/or the glue does not dry properly due to environmental conditions such as humidity. The foregoing are serious challenges to proper fitting and sealing of sewage systems. Additionally, Workers may, for example, cut a pipe incorrectly on-site, but proceed to use it despite its defective nature. Using defective pipes place tension on the system and are the subject of stress on the system. Accordingly, current sewage systems often have leaks and pipe bursts, and are a common source of construction worker mistakes.

It becomes apparent that there is an immediate need for a prefabricated wall frame assembly system and method for constructing and installing the same, which reduces construction and installation time, decreases the number of workers needed on-site, minimizes the amount of materials used and wasted, and lowers the cost associated with wall construction. In conjunction with a prefabricated wall frame assembly system, there is also a need for a prefabricated wall frame assembly storage and transportation housing system. Furthermore, in view of challenges associated with sewage systems and walls, there is also an immediate need for a prefabricated sewage assembly system and method for the same to combat the above-described challenges associated with current sewage systems.

SUMMARY OF THE INVENTION

In view of the foregoing disadvantages that come with current systems and methods, the present invention is directed to an integrated wall and custom pallet system and method. Specifically, the present invention is directed to a prefabricated wall frame assembly system for installation in a partially complete structure (also known as a building shell) containing at least a ceiling and a floor, and method for installing the same; a prefabricated wall frame assembly system storage and transportation housing system; and a prefabricated sewage assembly system and method for constructing the same. It should be noted that the use of subheadings in the following specification are to enhance readability and should not be interpreted in a limiting sense. It should further be noted that the prefabricated wall frame assembly system may be used in other scenarios in addition to the erection of walls in partially complete structures. For example, the prefabricated wall frame assembly system may be used for the erection of structural walls as well as partition walls.

A. Prefabricated Wall Frame Assembly System with Telescopic Components.

A first preferred embodiment of the prefabricated wall frame assembly system features telescopic components. This preferred embodiment is comprised of a frame and at least one structural support member disposed on the frame, both being vertically adjustable. The at least one structural support member may include horizontal and/or vertical members. Moreover, the frame and the at least one structural support member are also configured to be horizontally adjustable in the preferred embodiment. The frame and the at least one structural support member are preferably comprised of lightweight metal, such as galvanized steel, but may be comprised of other metal, wood, plastic, other metal, or any other material(s) in alternative embodiments.

Both the frame and the at least one structural support member are correspondingly dimensioned and configured to permit installation of the prefabricated wall frame assembly system by sliding the frame and the at least one structural support member into an installed disposition against the ceiling. The system may further include a foot member configured to attach to the floor. For example, to facilitate installation of the preferred embodiment, the at least one structural support member and the frame are slid vertically upwards until the prefabricated wall frame assembly system meets the ceiling. The system is then secured. If the embodiment includes a foot member, the same is secured to the floor. The telescopic component, described immediately below, better accommodates variations in height between the floor and the slab, which is especially beneficial given the common nature of such variations.

In the preferred embodiment, the frame and the at least one structural support member are vertically adjustable or extendable due to a telescopic modular system. More specifically, a vertical portion of the frame and the at least one structural support member are individually comprised of a first stud and a second stud in the preferred embodiment. The first stud and the second stud are disposed in slidable relation to one another and are configured to overlap a minimum overlap distance. In the preferred embodiment, the minimum overlap distance is at least one foot, but it may be greater or less than one foot in other embodiments.

Further, in the preferred embodiment, there is nonlinear overlap of the first stud and the second stud comprising each of the at least one structural support member and the frame. This helps to strengthen and stabilize the prefabricated wall frame assembly, facilitating enhanced structural performance. To illustrate, the first stud of the vertical portion of the frame has a first length, and the first stud of the at least one structural support member has a second length. The first length and the second length are unequal, and therefore do not have linear overlap relative to one another. Moreover, the second stud of the vertical portion of the frame has a third length, and the second stud of the at least one structural support member has a fourth length. The third length is unequal to the fourth length, similarly resulting in nonlinear overlap. It is also preferred that every other of the at least one structural support member first studs with the same length as one another, and second studs with the same lengths as one another. In other embodiments, the first length, second length, third length, and fourth length may be all the same, all different, or have at least two of the same lengths. As discussed, however, in the preferred embodiment the first length overlaps with the second length the minimum overlap distance of at least one foot, as does the third length with the fourth length.

The prefabricated wall frame assembly system may further include at least one rough-in component, housed by the frame, in the preferred embodiment. The at least one rough-in component is preferably configured to facilitate mechanical, electrical, and plumbing (MEP) connections to the system. Such MEP connections make it so that the system can provide, for example, plumbing to a bathroom adjacent to or near the system in the partially complete structure, once installed. From an electrical standpoint, the system may further include an electrical or low voltage panel, which is preferably housed within the frame. The MEP connections are more fully described below.

With respect to the electrical aspect of the MEP connections, the at least one rough-in component may be configured to facilitate electrical offsite integration of receptacles, switches, fire alarms, light outlets in the prefabricated wall frame assembly system, and electrical cables connected to an electrical box. Such electrical boxes may be comprised of polyvinyl chloride (PVC), plastic, and/or metal. The aforementioned electrical cables may be non-metallic sheathed cables, metal clad (MC) cables, non-metallic flexible conduit (NMFC/SMURF), stranded cables, and/or solid cables.

With respect to the plumbing aspect of the MEP connections, the at least one rough-in component may be configured to provide a water supply. The at least one rough-in component may be further configured to integrate components such as a shower mixer, a shower head, a toilet water outlet, vanity H/C water outlets, kitchen sink outlets, dishwasher outlets, refrigerator ice-maker boxes, washer drainage, and water box. For avoidance of doubt, all of the foregoing may be integrated in the prefabricated wall frame assembly. The water supply as well as any drainage, sewer, or other pipe systems and fittings may be comprised of cross-linked polyethylene (PEX), PVC, chlorinated polyvinyl chloride (CPVC), plastics, and/or metal.

Lastly, the preferred embodiment of the prefabricated wall frame assembly system includes backings and reinforcements, which may be comprised of metal or wood. The prefabricated wall frame assembly system may further permit the installation of cabinets, shelving, fireplaces, and televisions.

B. Prefabricated Wall Frame Assembly System with a Cap Member.

A second preferred embodiment of the prefabricated wall frame assembly system includes a cap member in addition, or as an alternative, to the telescopic arrangement described above. This preferred embodiment comprises a frame, at least one structural support member disposed on the frame, and a cap member disposed in slidably fastened communication with the frame via at least one aperture. The frame, the cap member, and the at least one structural support member are comprised of a lightweight metal in the preferred embodiment, but may be comprised of any other material(s) in other embodiments, such as wood, other metal, or plastic. In the preferred embodiment, the cap member, the frame, and the at least one aperture are correspondingly dimensioned and configured to permit installation of the prefabricated wall frame assembly system by sliding the cap member into an installed disposition against the ceiling of the partially complete structure. The system may further include a foot member configured to attach to the floor, securing the system into an installed disposition.

The cap member is structured to slide a cap distance via the at least one aperture in the preferred embodiment. Put differently, the cap member may slide the length of the at least one aperture, which effectively serves as a track on which the cap member can move along the frame. The cap member can include just the cap member itself, or it may be part of an angle element. The cap member may be angled, or be of a U-format, L-format, or any other format or shape. To install this embodiment of the system, the cap member is slid up the frame to ceiling height, the movement being facilitated by the at least one aperture which secures the cap member to the frame. In other embodiments, the at least one aperture may facilitate horizontal and/or diagonal movement of the cap member, individually, together, and/or in addition to vertical movement. The at least one aperture is preferably oblong in shape, but may be another shape or other shapes in alternative embodiments, such as trapezoidal. The at least one aperture may also include a fastening mechanism to effectively lock the cap member into place anywhere along the at least one aperture.

Importantly, this second preferred embodiment of the system (including the cap member) may be used independently, or in conjunction with the first preferred embodiment described above (the prefabricated wall frame assembly system with telescopic components). Accordingly, in another embodiment of the system that includes the cap member, the frame and the at least one structural support member are configured to be vertically adjustable as well. The system could therefore be used by sliding the cap member into an installed disposition against ceiling, whether alone or in addition to adjusting the frame and the at least one structural support member vertically by sliding each upwards.

In this embodiment, there is nonlinear overlap of the first stud and the second stud comprising each of the at least one structural support member and the frame. To reiterate, this facilitates enhanced structural performance. As detailed above, the first stud of the vertical portion of the frame has a first length, and the first stud of the at least one structural support member has a second length. The first length and the second length are unequal, and therefore do not have linear overlap relative to one another. Additionally, the second stud of the vertical portion of the frame has a third length, and the second stud of the at least one structural support member has a fourth length. The third length is unequal to the fourth length, again resulting in nonlinear overlap. It is also preferred that every other of the at least one structural support member first studs with the same length as one another, and second studs with the same lengths as one another. In other embodiments, the first length, second length, third length, and fourth length may be all the same, all different, or have at least two of the same lengths. Nonetheless, in the preferred embodiment the first length overlaps with the second length the minimum overlap distance of at least one foot, as does the third length with the fourth length.

Identically to the first preferred embodiment, this second preferred embodiment may also include at least one rough-in component, housed by the frame. The at least one rough-in component is preferably configured to facilitate mechanical, electrical, and plumbing (MEP) connections to the system. The system may further include an electrical or low voltage panel, preferably housed within the frame. The MEP connections are more fully described below.

Regarding the electrical aspect of the MEP connections, the at least one rough-in component may be configured to facilitate electrical offsite integration of receptacles, switches, fire alarms, light outlets in the prefabricated wall frame assembly system, and electrical cables connected to an electrical box. Such electrical boxes may be comprised of PVC, plastic, and/or metal. The aforementioned electrical cables may be non-metallic sheathed cables, MC cables, non-metallic flexible conduit (NMFC/SMURF) cables, stranded cables, and/or solid cables.

Again in view of the plumbing aspect of the MEP connections, the at least one rough-in component may be configured to provide a water supply. The at least one rough-in component may be further configured to integrate components such as a shower mixer, a shower head, a toilet water outlet, vanity H/C water outlets, kitchen sink outlets, dishwasher outlets, refrigerator ice-maker boxes, washer drainage, and a water box. For avoidance of doubt, all of the foregoing May be integrated in the prefabricated wall frame assembly. The water supply as well as any drainage, sewer, or other pipe systems and fittings may be comprised of PEX, PVC, CPVC, plastics, and/or metal.

Further, it should be noted that the preferred embodiment of the prefabricated wall frame assembly system includes backings and reinforcements, which may be comprised of metal or wood. The prefabricated wall frame assembly system may further permit the installation of cabinets, shelving, fireplaces, and televisions.

C. Prefabricated Wall Frame Assembly Storage and Transportation Housing System.

The present invention further relates to a prefabricated wall frame assembly storage and transportation housing system, comprising at least one base member, at least one pallet support member, a pallet floor, a plurality of pallet floor channels disposed on the pallet floor, and a plurality of side channels disposed on the at least one pallet support member. In addition, the prefabricated wall frame assembly storage and transportation housing system is preferably in the shape of a three-dimensional rectangle or cube (when in an expanded orientation, as discussed below). The preferred system is configured to transport and/or house at least one prefabricated wall assembly system at a time, but can preferably accommodate at least as many as the number of the plurality of pallet floor channels. The instant system facilitates easy loading and unloading of the prefabricated wall frame assembly systems and provides for stability during transportation and storage of the same. Additionally, the prefabricated wall frame assembly storage and transportation housing system may be configured to fit the dimensions of transportation specific vehicles, such as a large truck.

Preferably, the at least one base member and the at least one pallet support member are comprised of wood, but may be comprised of any other material(s) such as metal. Additionally, the pallet floor, the plurality of pallet floor channels, and the plurality of side channels are preferably comprised of metal, but may be comprised of any other material(s) such as wood.

Preferably, the plurality of pallet floor channels and the pallet floor run parallel to the ground, whereas the plurality of side channels run perpendicular to the ground. The plurality of pallet floor channels are configured to retain a first side of the frame of the prefabricated wall frame assembly system. In the preferred embodiment, the at least one pallet support member is defined as six vertical members disposed perpendicular to the pallet floor and two horizontal members disposed parallel to the pallet floor. Each horizontal at least one pallet support member retains a second and third side of the prefabricated wall frame assembly system in each of their respective side channels. The system is thus configured to permit the prefabricated wall frame assembly systems retained therein to slide to prevent distortion, stress, or other damage to the same while in storage and/or in transit.

The preferred embodiment further comprises at least one hinge mechanism disposed on the at least one pallet support member. The at least one hinge mechanism is structured to enable a change in orientation of the at least one pallet support member. In the preferred embodiment, the at least one hinge mechanism is configured to enable each at least one pallet support member to go from an expanded orientation to a collapsed orientation. The at least one pallet support member may be re-secured at any point in the range from expanded orientation to collapsed orientation.

The at least one hinge mechanism therefore enables the system to go from the open-air, three-dimensional cube or rectangle shape to a flat, collapsed orientation. In other words, the at least one hinge mechanism permits the system to fold onto itself, thereby reducing the system's volume. This collapse in orientation would occur when the system is not storing or transporting any prefabricated wall frame assembly systems. The compactness and much smaller volume of the system when in collapsed orientation permits the system to be transported and stored itself in a much more efficient manner, taking up far less space than when in expanded orientation and being easier to move.

Moreover, at least one base member of the system is configured to receive a lifting mechanism, such as the forks on a forklift or tractor. This enables the system to be moved efficiently in and out of certain spaces, such as a vehicle, the partially complete structure, or the factory. The at least one base member is designed to permit various different sizes of lifting mechanisms to enter and lift the system. Further, the preferred embodiment may be lifted whether in expanded or collapsed orientation, and whether or not carrying prefabricated wall frame assembly systems. The preferred embodiment also has both front and lateral areas of the at least one base member which the lifting mechanism may enter.

D. Method for Installing a Prefabricated Wall Frame Assembly System with Telescopic Components.

The invention further comprises a method for installing the prefabricated wall frame assembly system with telescopic components, described above. The preferred method comprises providing a prefabricated wall frame assembly system (including a frame and at least one structural support member), and providing a prefabricated wall frame assembly storage and transportation housing system (including at least one base member, at least one pallet support member, a pallet floor, a plurality of pallet floor channels disposed on the pallet floor, and a plurality of side channels disposed on the at least one pallet support member).

The method further comprises introducing the prefabricated wall frame assembly system to the prefabricated wall frame assembly storage and transportation housing system, and placing each prefabricated wall frame assembly system in removable communication with at least one of the plurality of pallet floor channels. The method next comprises placing the frame in removable communication with at least one of the plurality of side channels, and transporting the prefabricated wall frame assembly storage and transportation housing system to a partially complete structure.

Moreover, the method further comprises transporting at least one prefabricated wall frame assembly system into the partially complete structure through an opening therein. In another method, this may be accomplished by using a lifting mechanism to lift the entire prefabricated wall frame assembly storage and transportation housing system into the partially complete structure. A single prefabricated wall frame assembly system or many of the same may be transported into the partially complete structure.

The preferred method further comprises positioning the prefabricated wall frame assembly system in a predetermined location, pivoting the same about the predetermined location into an upright orientation, and securing the same to the partially complete structure. The method May further comprise slidably raising a vertical portion of the frame and the at least one structural support member into an installed disposition against the ceiling.

Additionally, the method may further include the step of providing an angled platform (including a frame, an angled support surface, and a plurality of feet), and delivering the prefabricated wall frame assembly system into the partially complete structure with the angled platform. The angled platform is preferably dimensioned and configured to fit within a balcony door opening, and receive a lifting mechanism.

E. Method for Installing a Prefabricated Wall Frame Assembly System with a Cap Member.

The invention further comprises a method for installing the prefabricated wall frame assembly system with a cap member, described above. The preferred method comprises providing a prefabricated wall frame assembly system (including a frame, at least one structural support member, and a cap member), and providing a prefabricated wall frame assembly storage and transportation housing system (including at least one base member, at least one pallet support member, a pallet floor, a plurality of pallet floor channels disposed on the pallet floor, and a plurality of side channels disposed on the at least one pallet support member).

The method further comprises introducing the prefabricated wall frame assembly system to the prefabricated wall frame assembly storage and transportation housing system, and placing each prefabricated wall frame assembly system in removable communication with at least one of the plurality of pallet floor channels. The method further comprises placing the frame in removable communication with at least one of the plurality of side channels, and transporting the prefabricated wall frame assembly storage and transportation housing system to a partially complete structure.

Continuing on, the method further comprises transporting at least one prefabricated wall frame assembly system into the partially complete structure through an opening therein. In another method, as above, this may be accomplished by using a lifting mechanism to lift the entire prefabricated wall frame assembly storage and transportation housing system into the partially complete structure. A single prefabricated wall frame assembly system or many of the same May be transported into the partially complete structure.

The preferred method further comprises positioning the prefabricated wall frame assembly system in a predetermined location, pivoting the same about the predetermined location into an upright orientation, and securing the same to the partially complete structure. The method May further comprise slidably raising the cap member into an installed disposition against the ceiling.

In addition, the method may further include the step of providing an angled platform (including a frame, an angled support surface, and a plurality of feet), and delivering the prefabricated wall frame assembly system into the partially complete structure with the angled platform. The angled platform is preferably dimensioned and configured to fit within a balcony door opening, and receive a lifting mechanism.

F. Prefabricated Sewage Assembly System.

The present invention further relates to a prefabricated sewage assembly system. The system comprises a plurality of base members, a plurality of adjustable brackets (each individually disposed on each of the plurality of base members), a plurality of slots disposed on each of the adjustable brackets, a plurality of slot pins disposed within each of the plurality of slots (each configured to slide a slot distance via the plurality of slots), and a plurality of pipe anchors correspondingly dimensioned and configured to receive and permit installation of a plurality of pipes. Moreover, the plurality of pipes comprises a network of interconnected pipes. The prefabricated sewage assembly system is also correspondingly dimensioned and configured to permit installation within a structure. The system may be correspondingly dimensioned and configured to permit installation on a prefabricated wall frame assembly system, or in the floor and/or ceiling of the structure, which may be complete or partially complete.

The adjustable brackets are comprised of horizontally and vertically adjustable bracket components in the preferred embodiment, and permit disposal of the plurality of adjustable brackets in a plurality of orientations. Further, the plurality of slots are disposed in a plurality of orientations on each of the plurality of adjustable brackets in the preferred embodiment. The plurality of adjustable brackets enable the system to reach the proper pipe slope and angle to connect and fit the plurality of pipes.

Each of the plurality of pipe anchors are correspondingly dimensioned and configured to retain each of said plurality of pipes in the preferred embodiment. Further, it is preferable that the plurality of pipes, as well as any corresponding fittings, are comprised of PVC material, but can also be comprised of metal, plastic, or any other material. The prefabricated system results in precise slope and better quality gluing of the plurality of pipes and their fittings, which reduces the risk of leaks and mistakes.

G. Method for Constructing a Prefabricated Sewage Assembly System.

The invention is also directed to a method for constructing a prefabricated sewage assembly system. The method comprises providing a plurality of base members, a plurality of adjustable brackets disposed on the plurality of base members, a plurality of slots disposed on each of the plurality of adjustable brackets, a plurality of slot pins disposed within each of the plurality of slots, a plurality of pipe anchors, a plurality of pipes, and an assembly platform. Preferably, the assembly platform is comprised of wood, but may be any other material such as metal or plywood in other embodiments.

The method further comprises securing each of the plurality of base members to predetermined locations on the assembly platform. In the preferred method, each of the plurality of base members are secured to the assembly platform via screws. Moreover, the method further comprises adjusting each of the plurality of adjustable brackets to an optimal orientation, and sliding each of the plurality of slot pins within each of the plurality of slots to an optimal slot pin location (to secure each of the plurality of adjustable brackets).

The method further comprises providing and securing each of the plurality of pipes to each of the plurality of pipe anchors, and connecting and securing the plurality of pipes to one another. In the preferred embodiment, the plurality of pipes, as well as their corresponding fittings, are comprised of PVC and are secured to one another with glue, which is given ample time to fully dry before installation. In other embodiments, the plurality of pipes may be comprised of other material, such as metal or plastic, and may be secured together in any other suitable way. After construction is complete, the sewage assembly system may be installed in a prefabricated wall frame assembly system and/or in a complete or partially complete structure in the ceiling and/or floor.

All of the foregoing and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
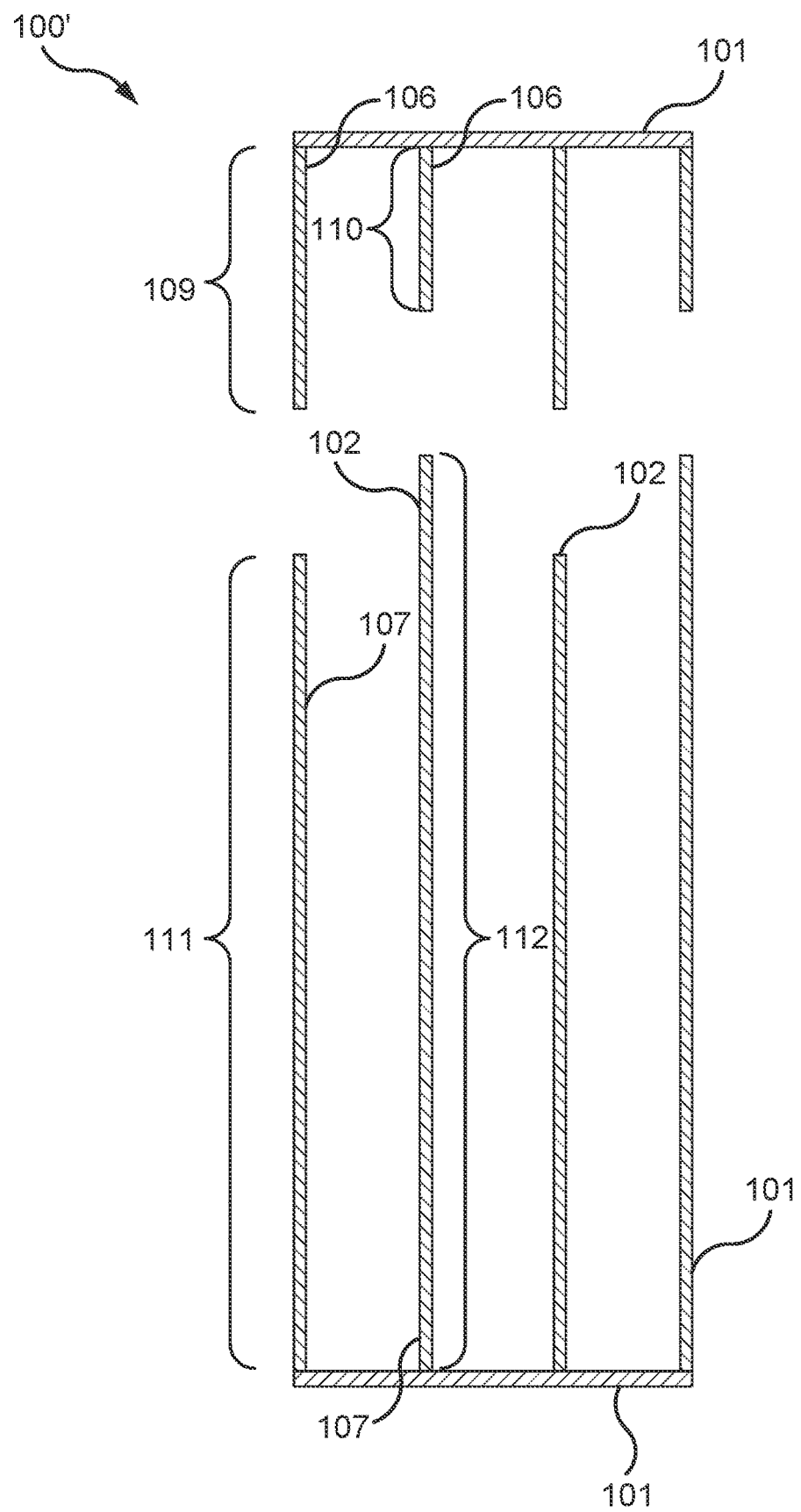
FIG. 1 is a schematic, front perspective, exploded view of the prefabricated wall frame assembly system with telescopic components.
Figure 2:
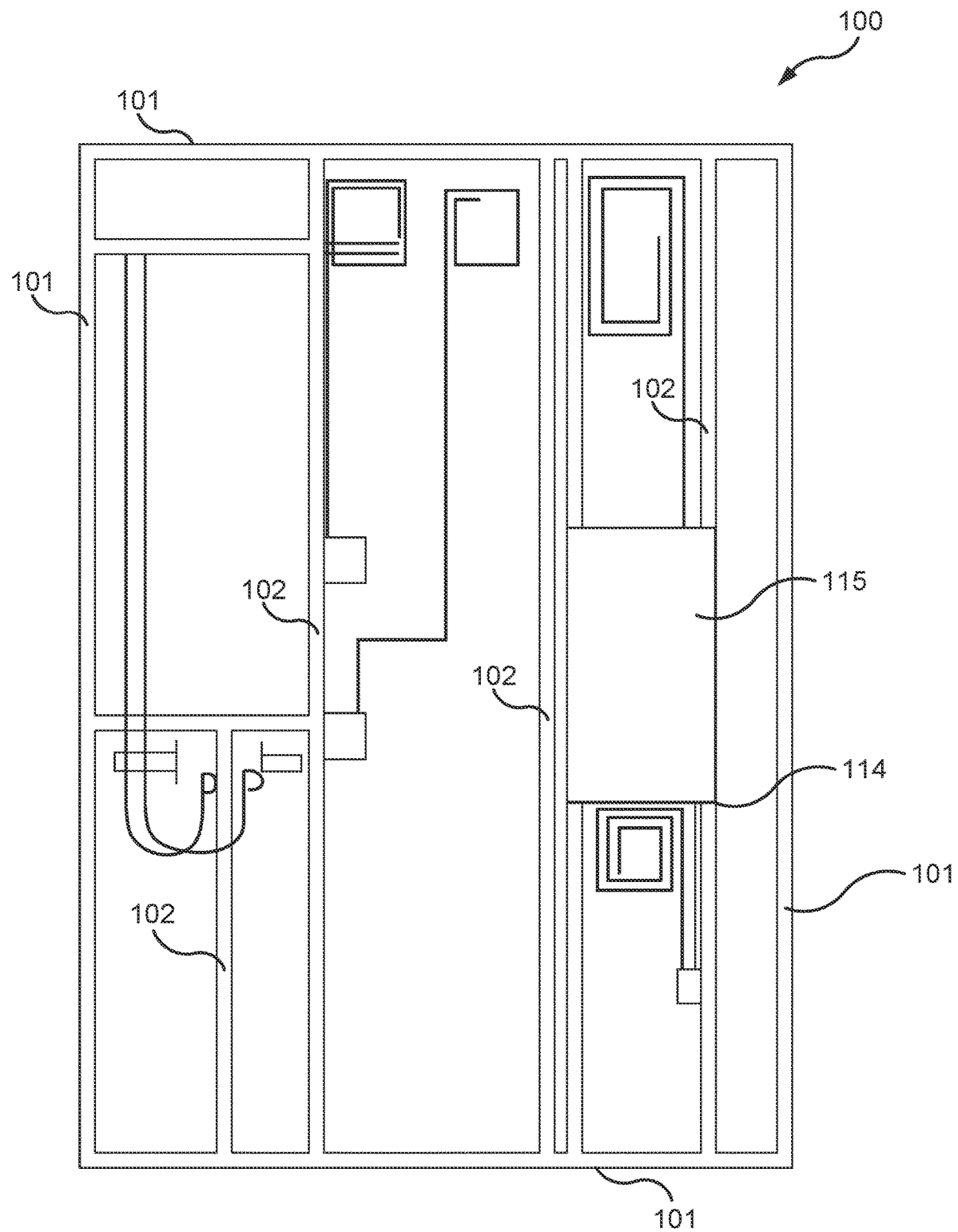
FIG. 2 is a schematic, front perspective view of the prefabricated wall frame assembly.
Figure 3:
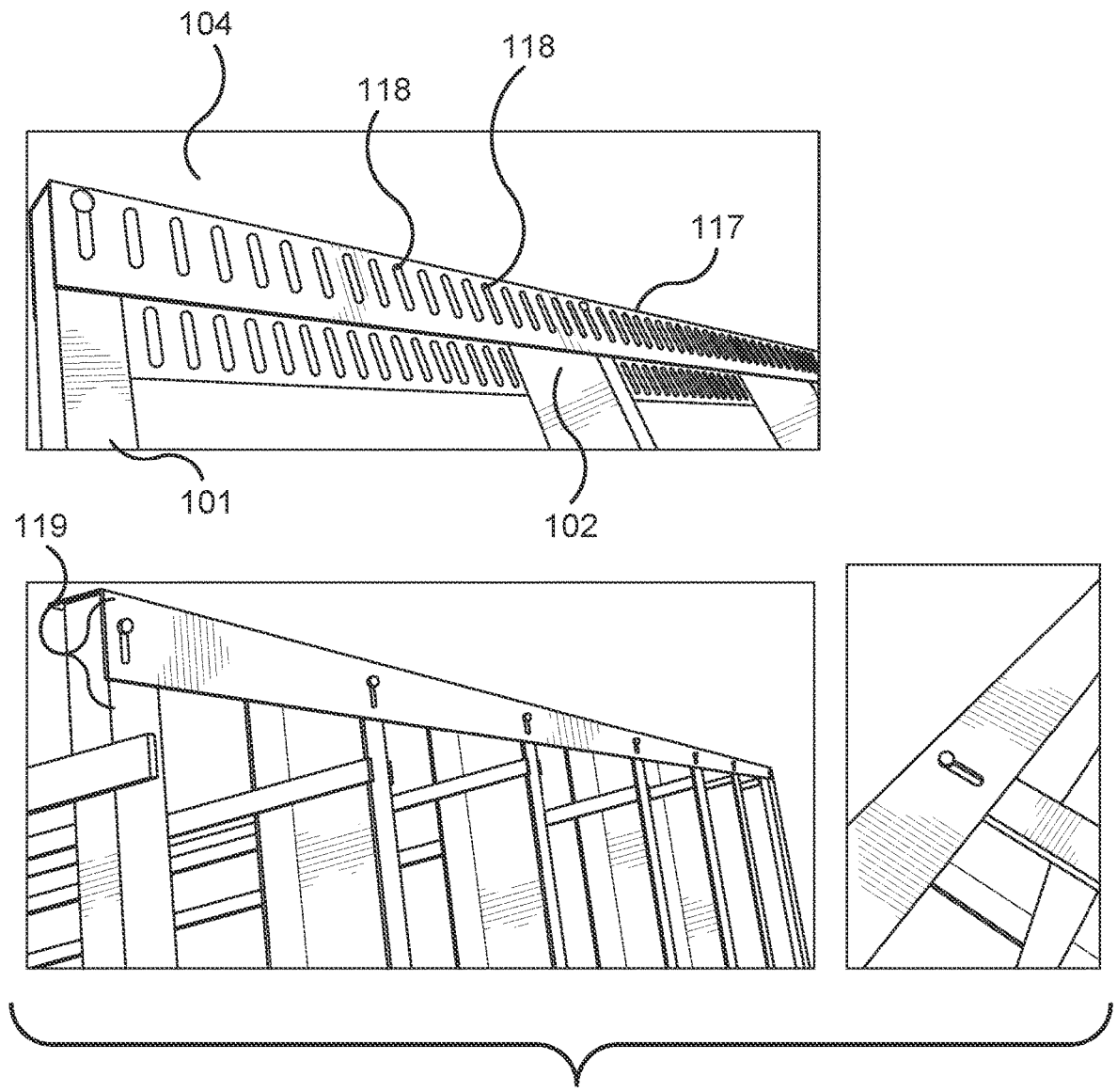
FIG. 3 is a top-front perspective view of the prefabricated wall frame assembly system with cap member.
Figure 4:
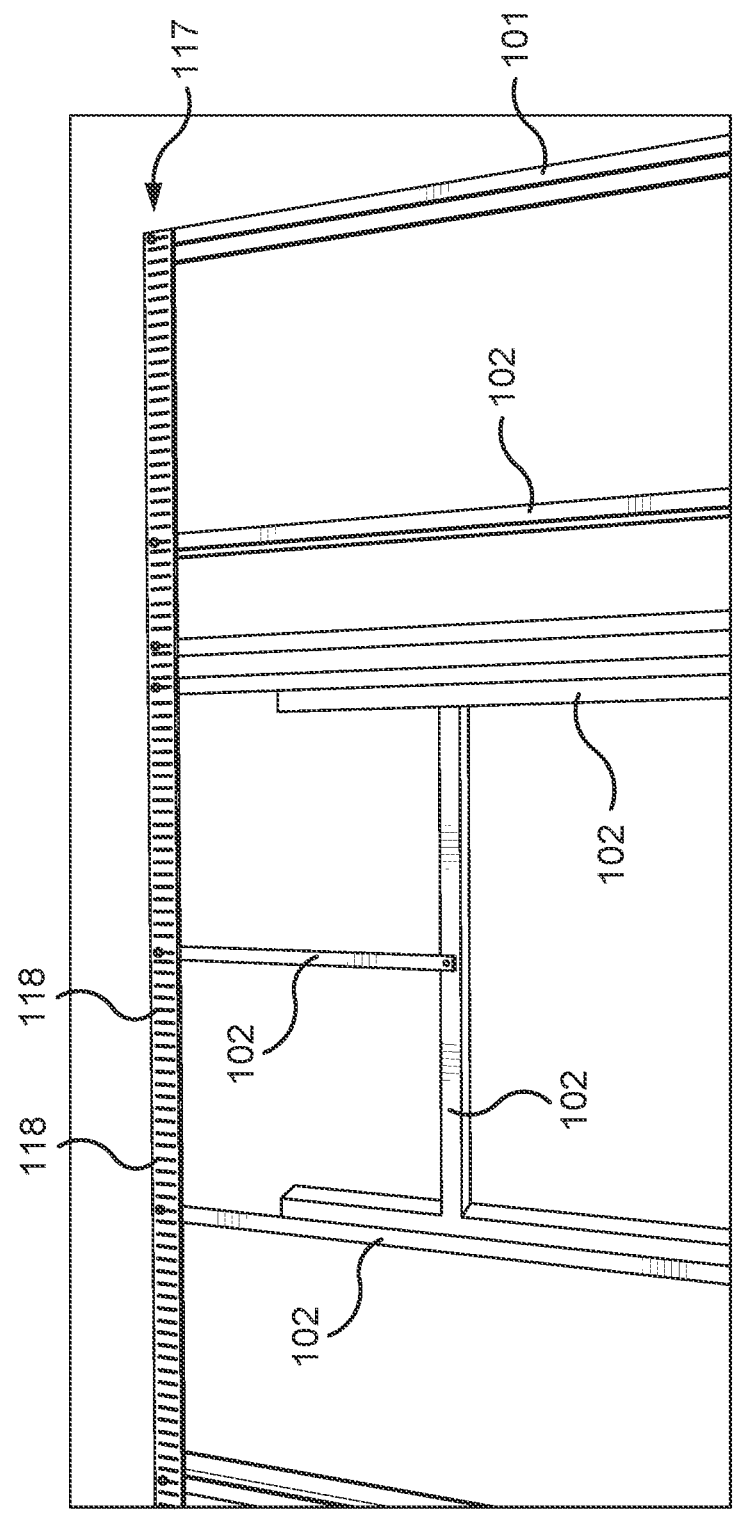
FIG. 4 is a top-front perspective view of the prefabricated wall frame assembly system with cap member.
Figure 5:
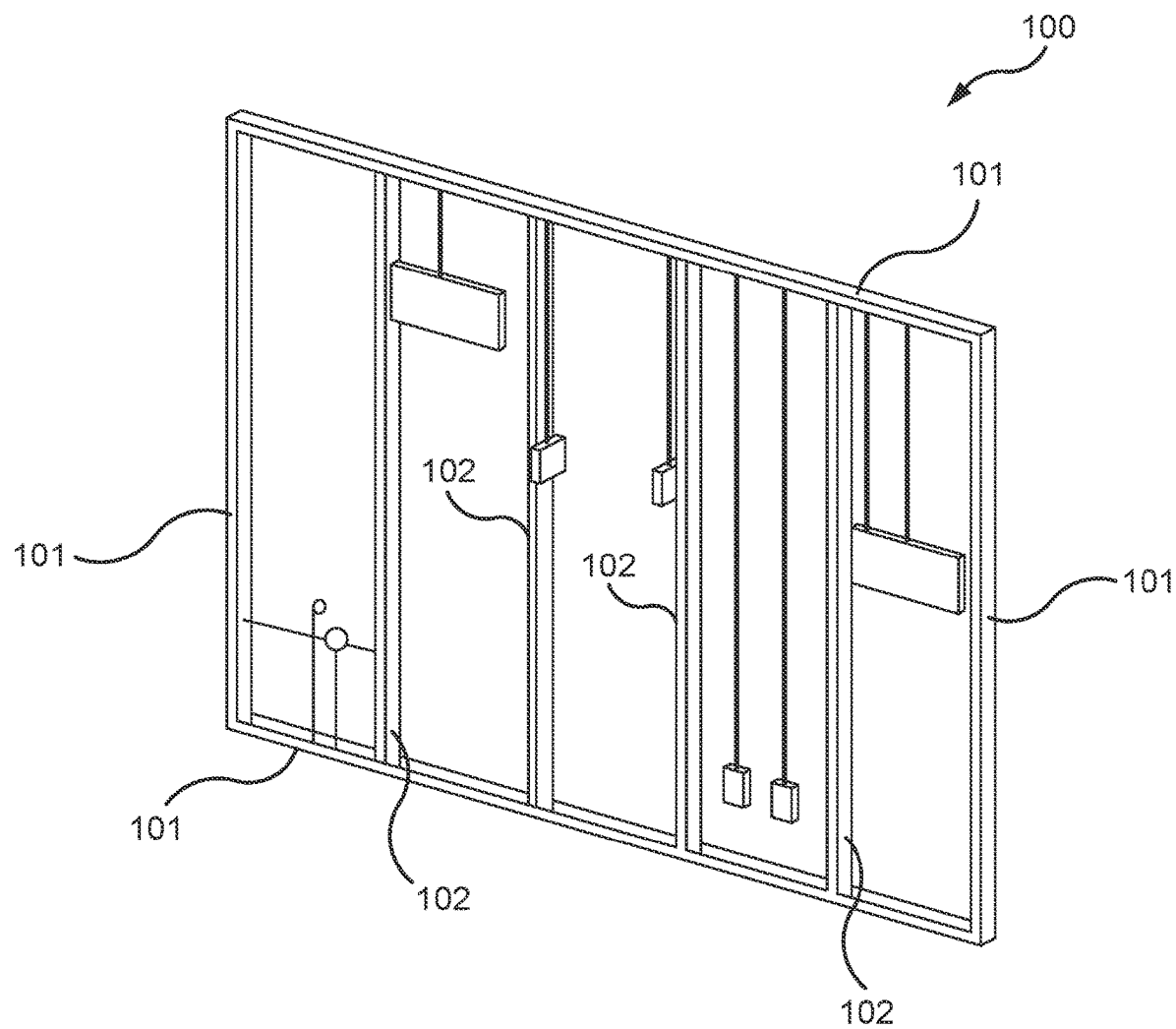
FIG. 5 is a schematic, angled perspective view of the prefabricated wall frame assembly system.
Figure 6:
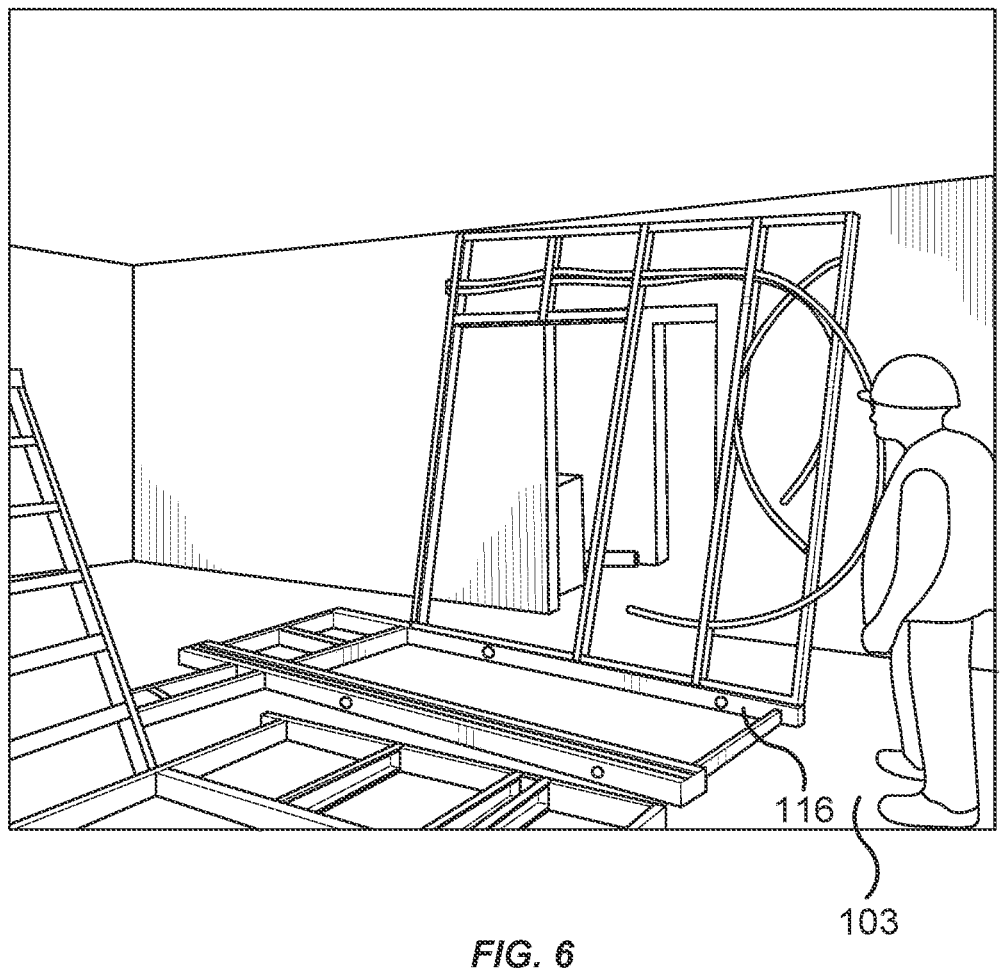
FIG. 6 is a front perspective view of the prefabricated wall frame assembly system.
Figure 7:
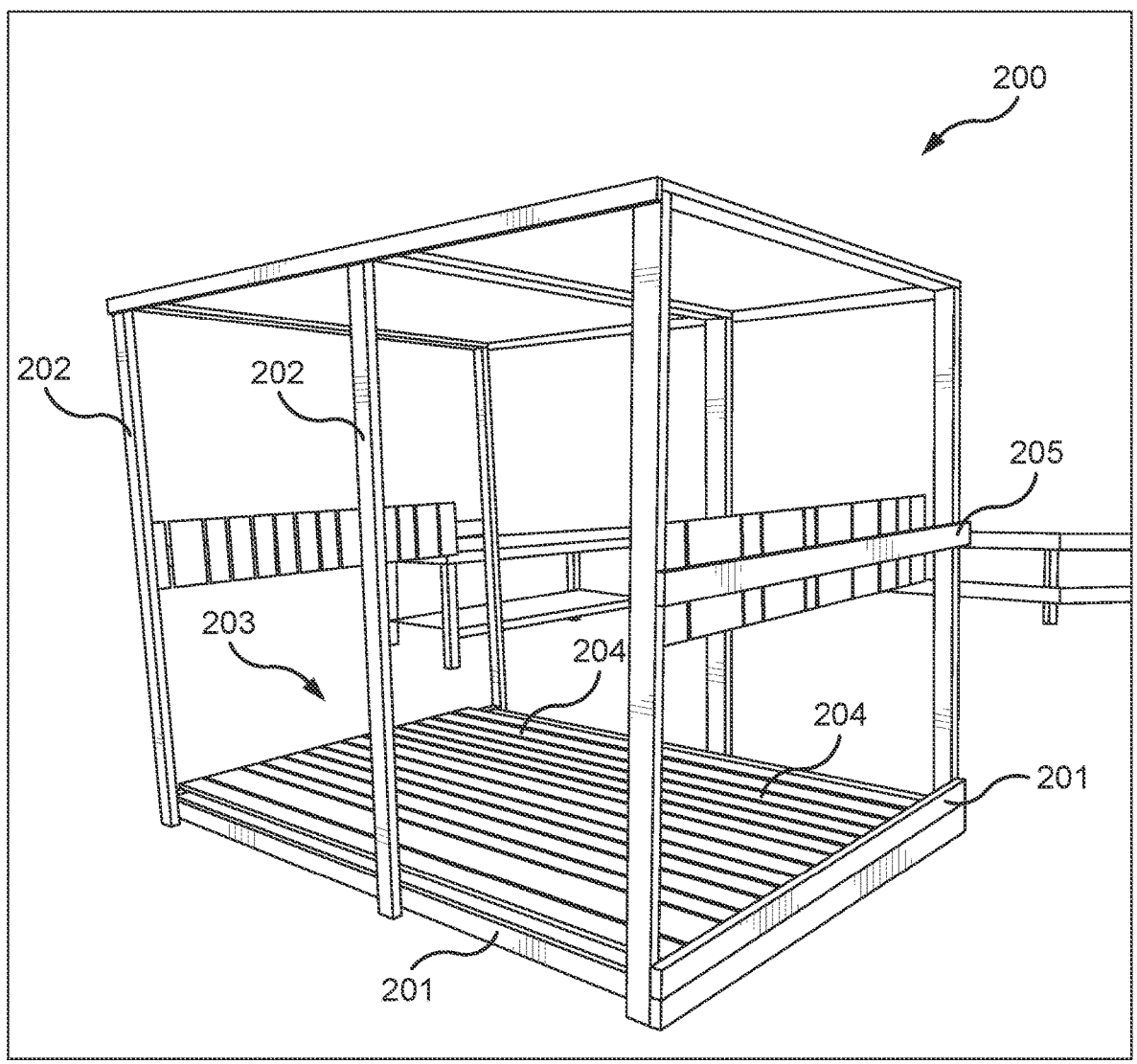
FIG. 7 is a side perspective view of the prefabricated wall frame assembly storage and transportation housing system.
Figure 8:
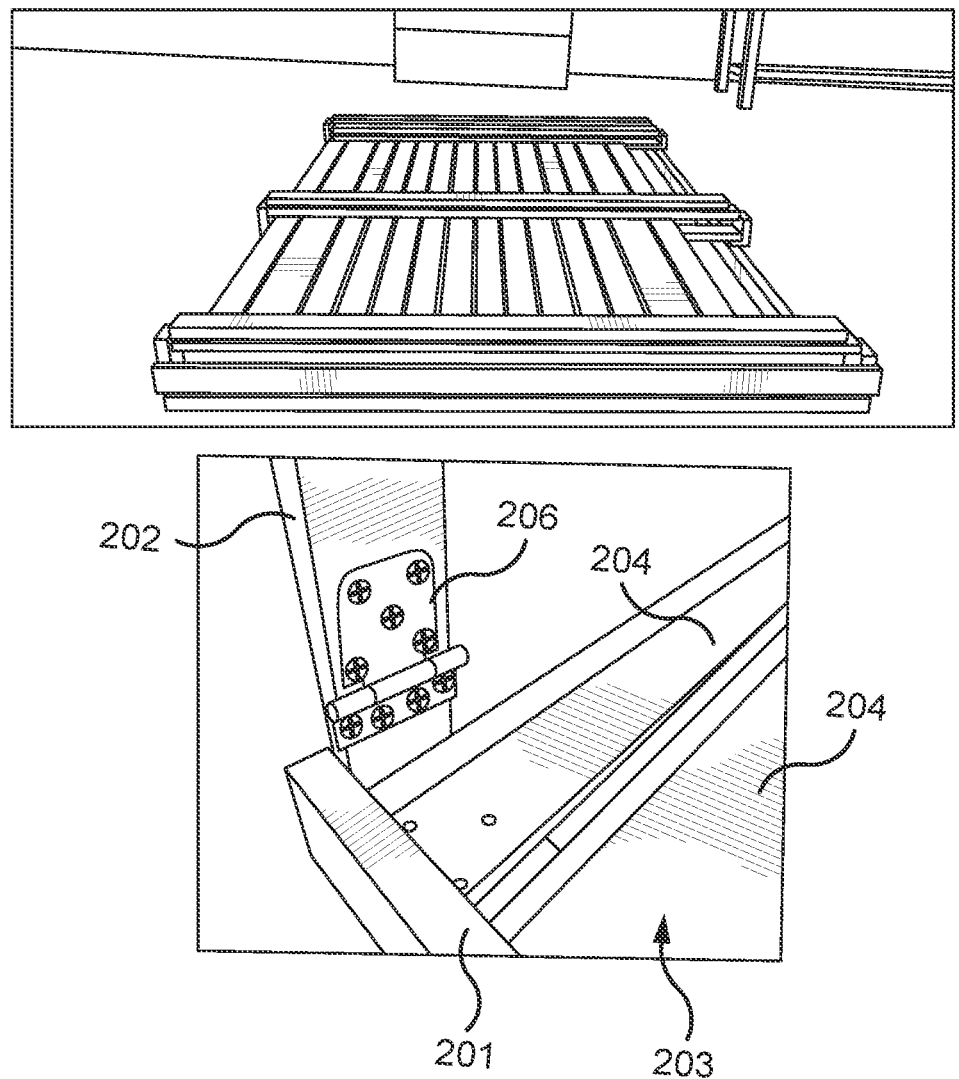
FIG. 8 is a side perspective view of the prefabricated wall frame assembly storage and transportation housing system.
Figure 9:
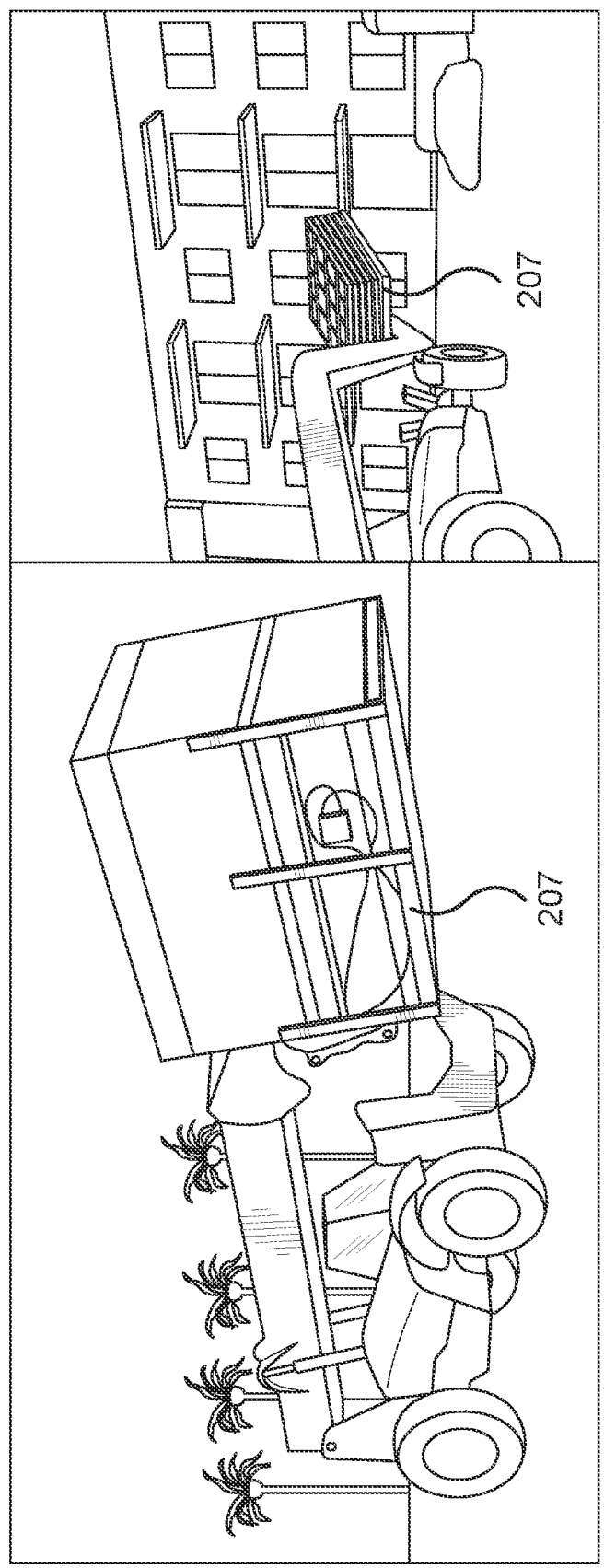
FIG. 9 is a side perspective view of the prefabricated wall frame assembly storage and transportation housing system.
Figure 10:
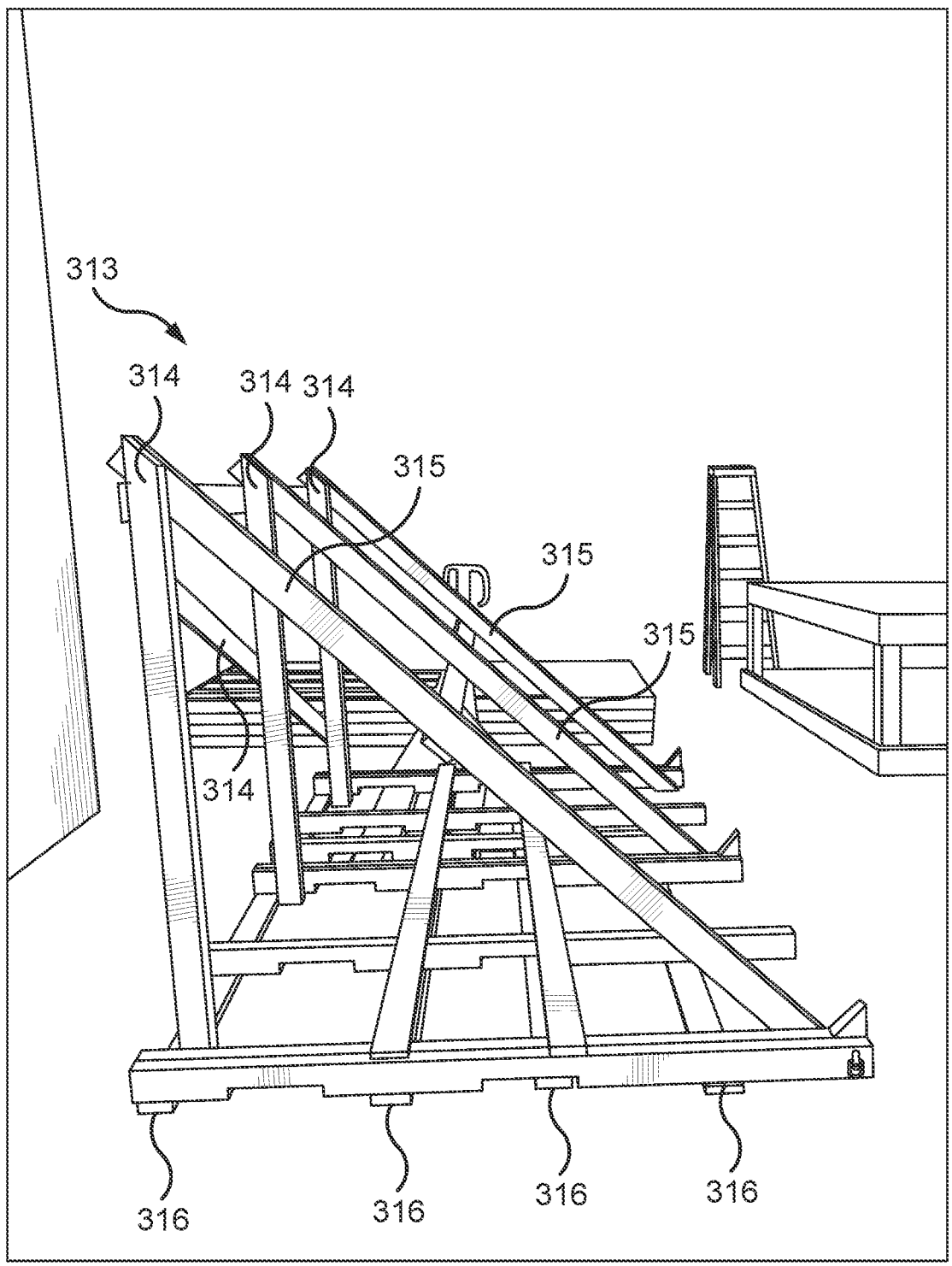
FIG. 10 is a side perspective view of the angled platform.
Figure 11:
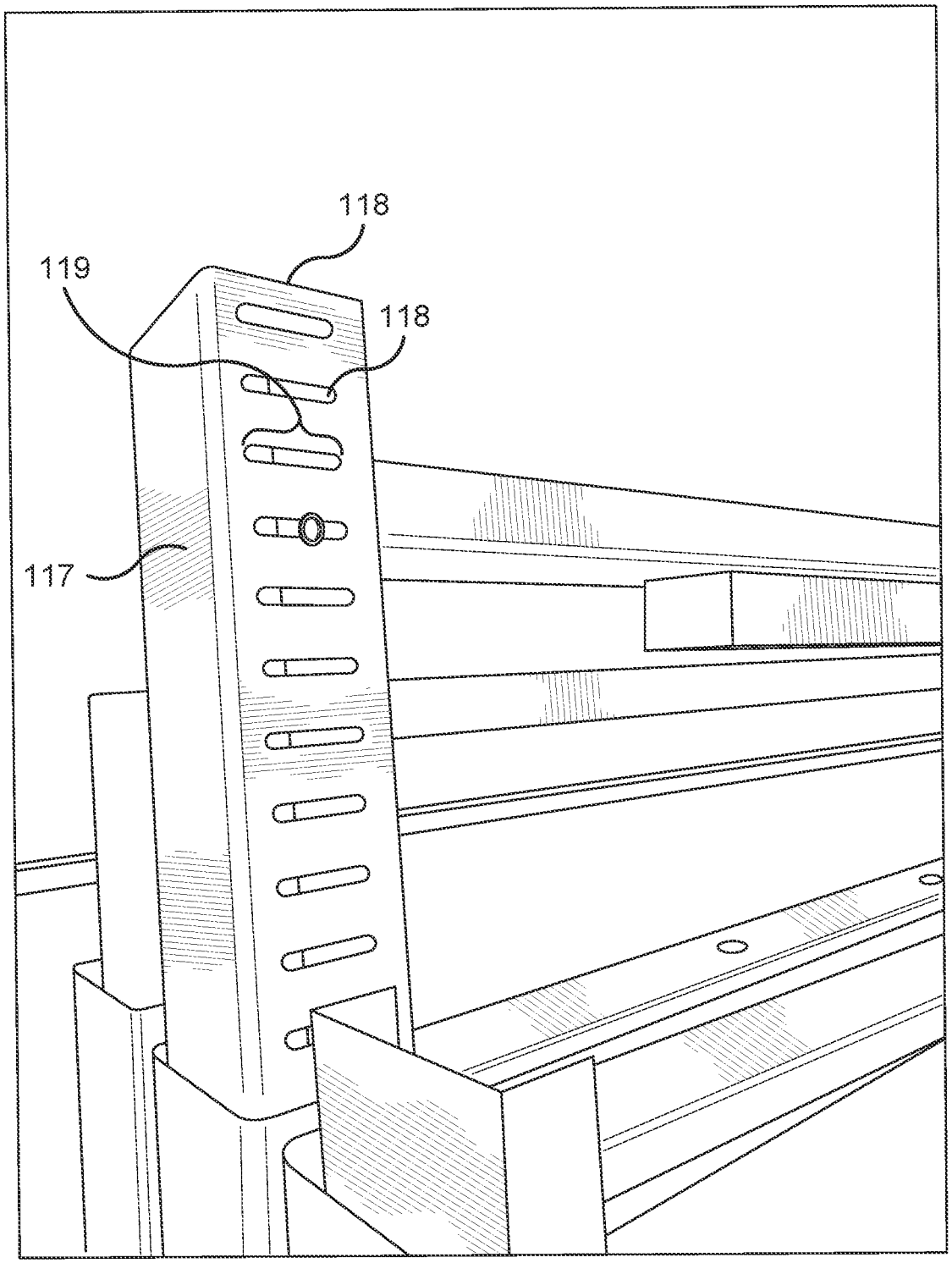
FIG. 11 is a top-front perspective view of the prefabricated wall frame assembly system with cap member.
Figure 12:
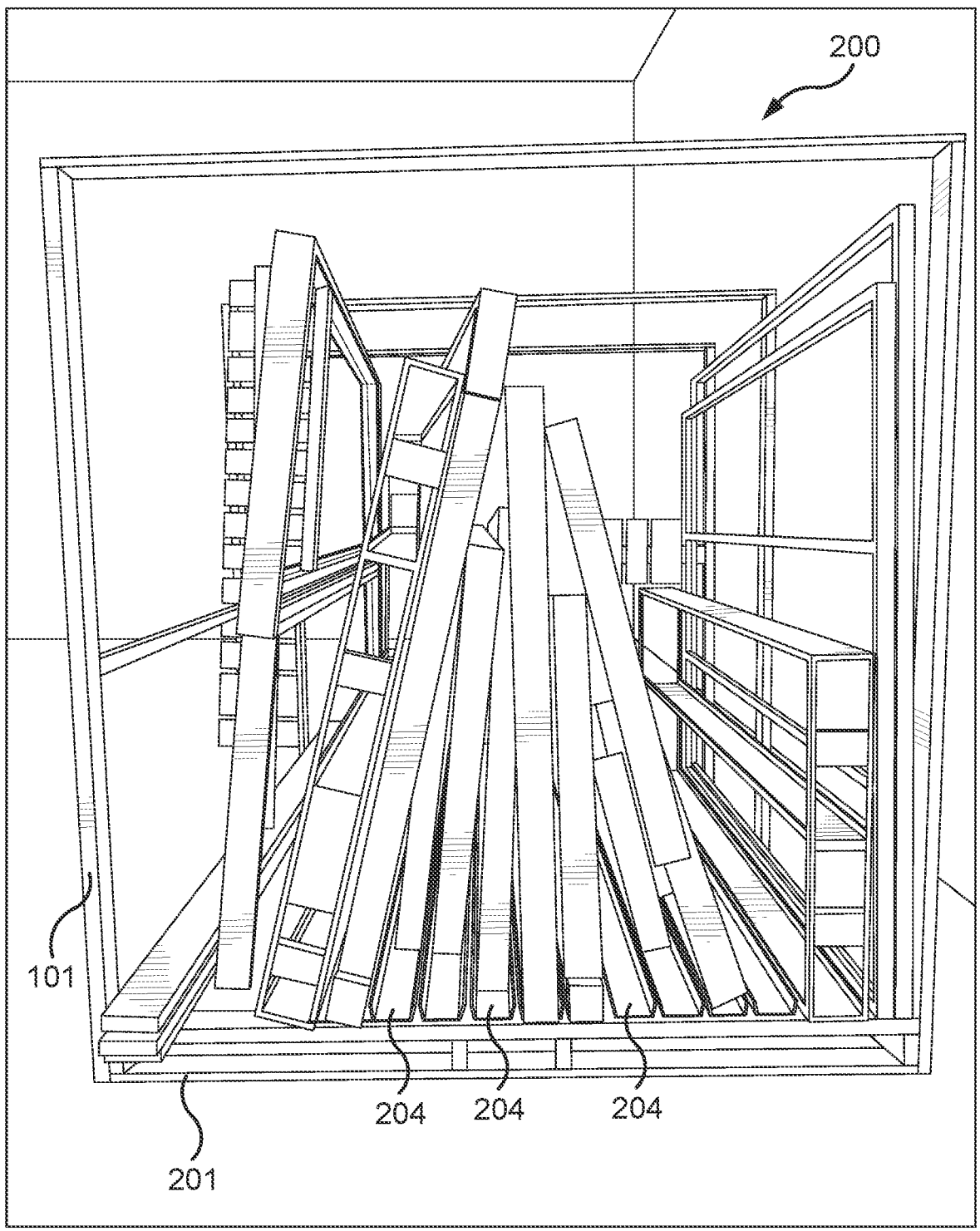
FIG. 12 is a side perspective view of the prefabricated wall frame assembly storage and transportation housing system.
Figure 13:
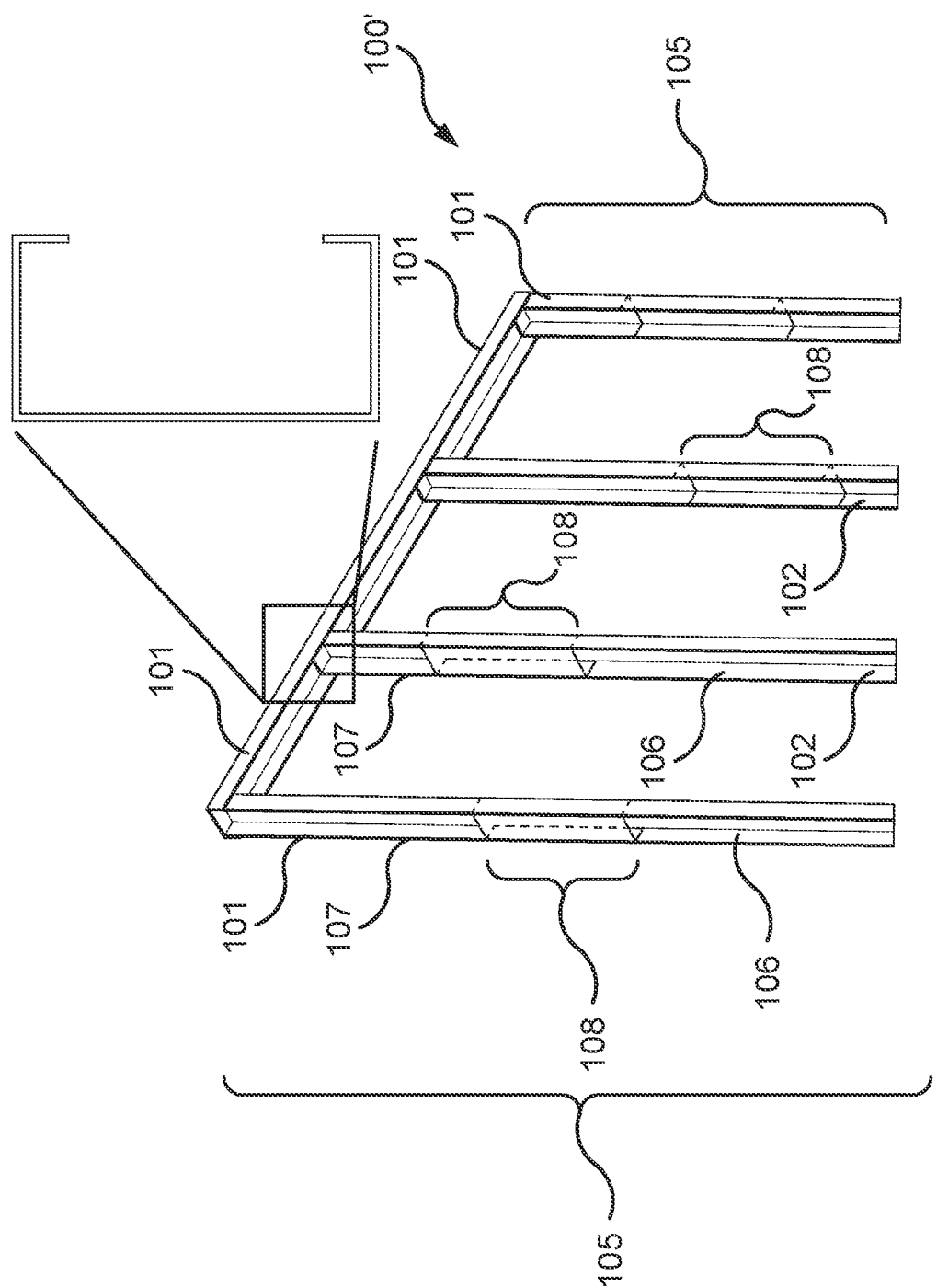
FIG. 13 is an angled, schematic perspective view of the prefabricated wall frame assembly system with telescopic components.
Figure 14:
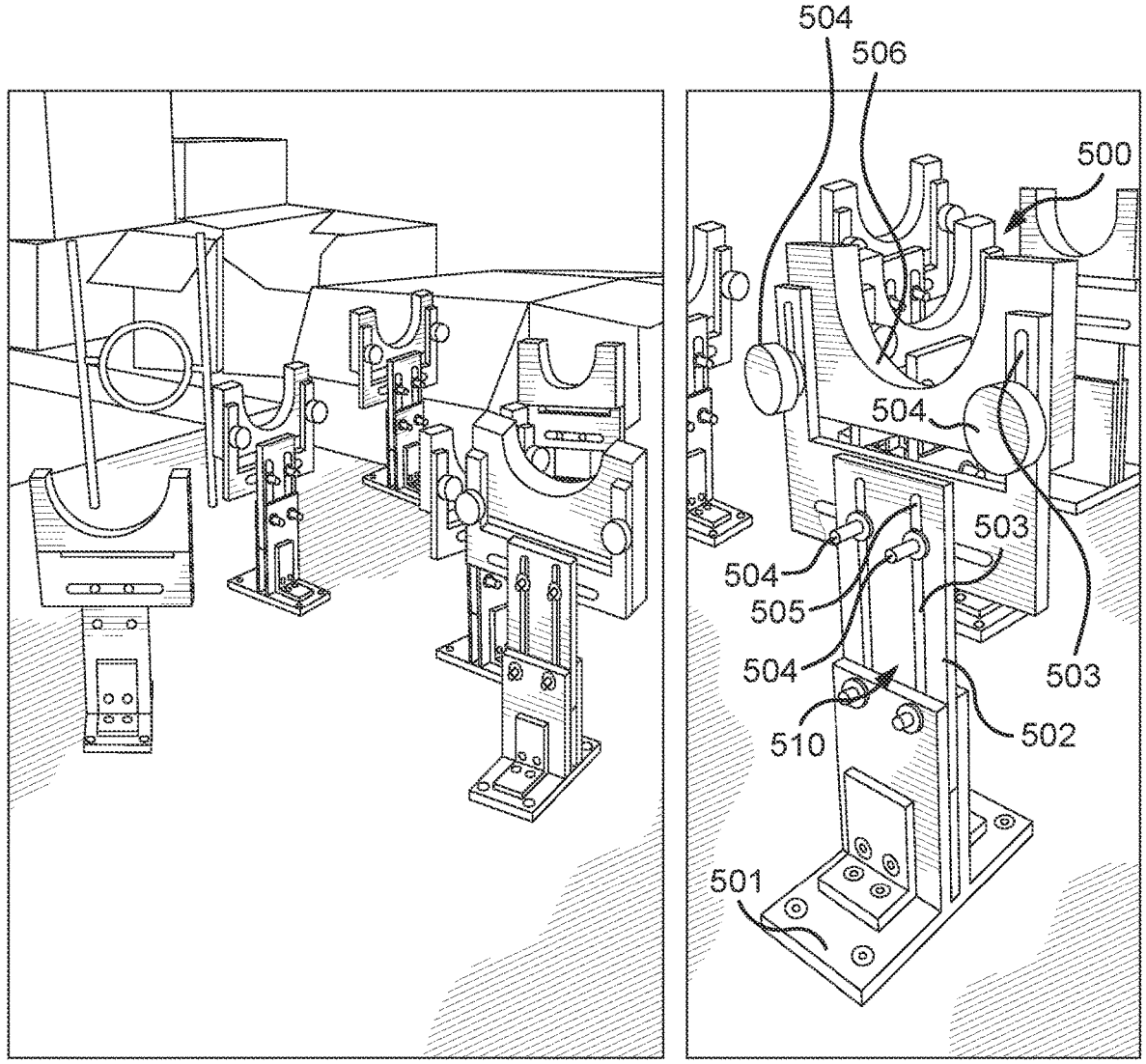
FIG. 14 is top-front perspective view of the sewage assembly system.
Figure 15:
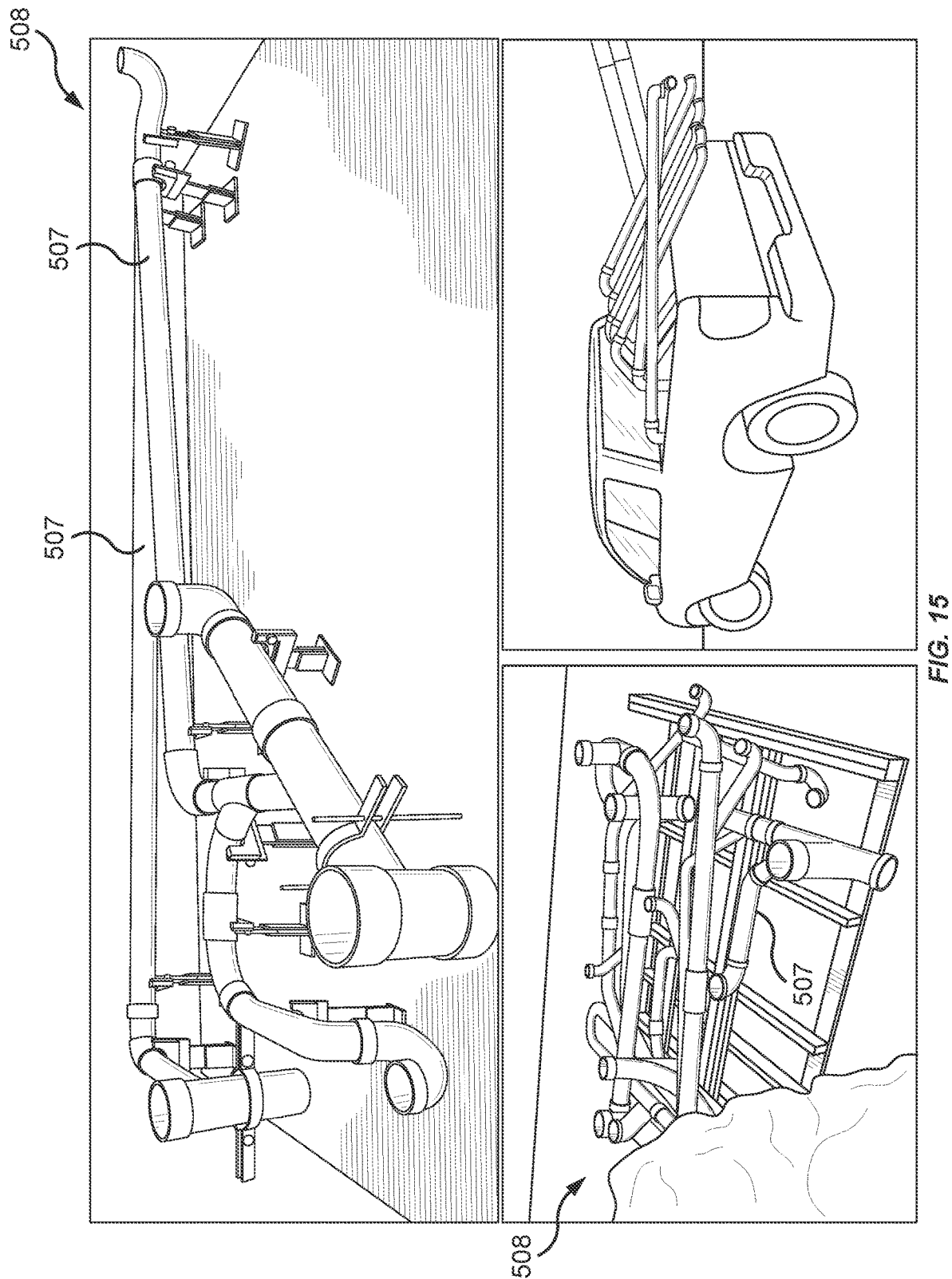
FIG. 15 is a top perspective view of the sewage assembly system.
Figure 16:
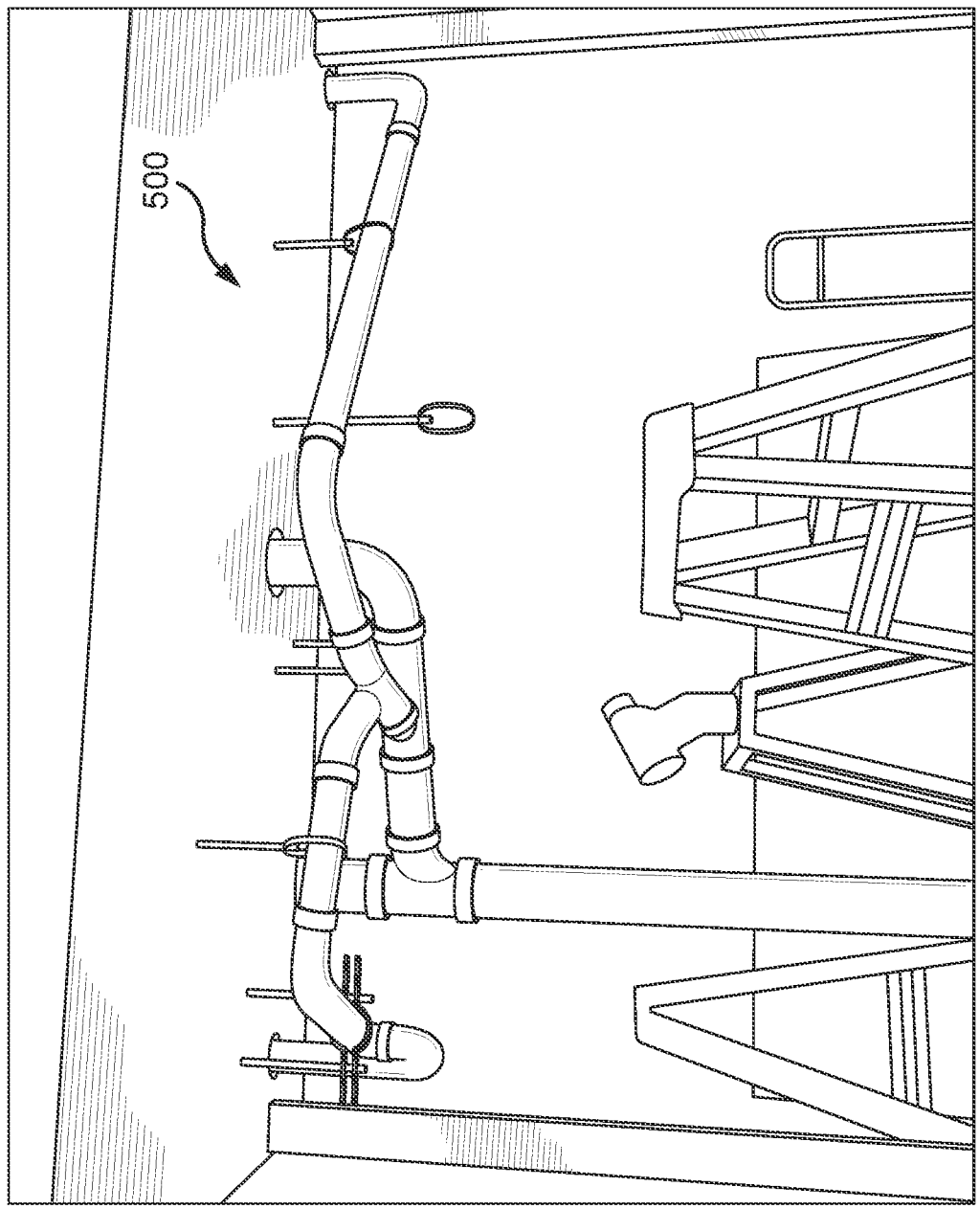
FIG. 16 is a side perspective view of the sewage assembly system.
Figure 17:
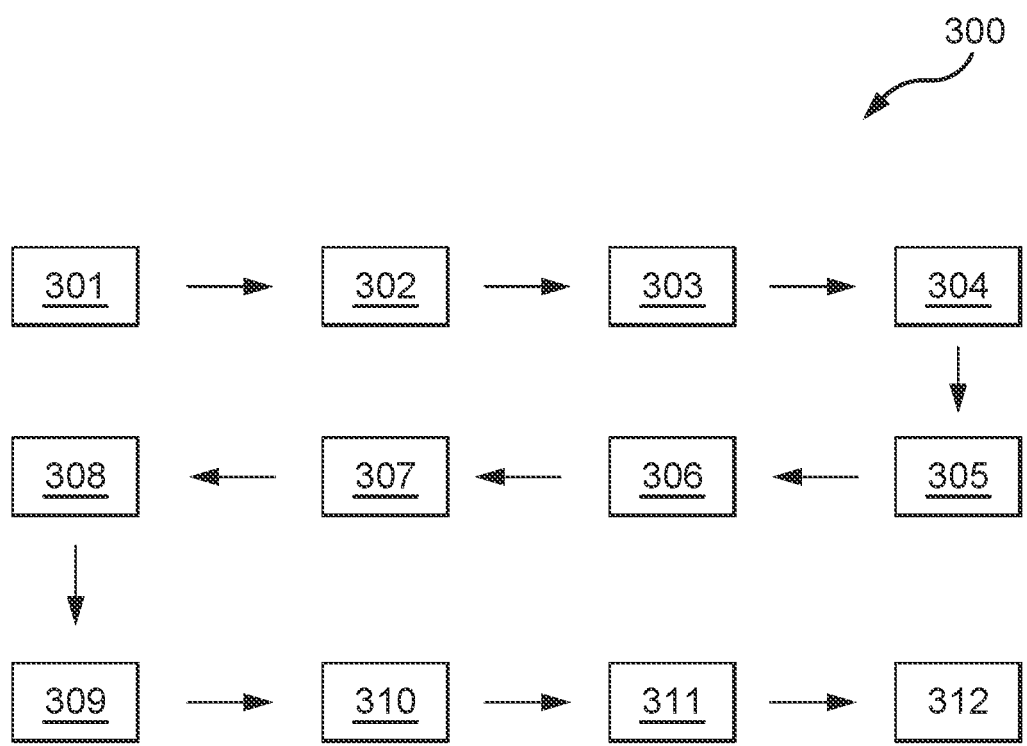
FIG. 17 is a schematic flowchart illustrating the method for installing a prefabricated wall frame assembly system.
Figure 18:
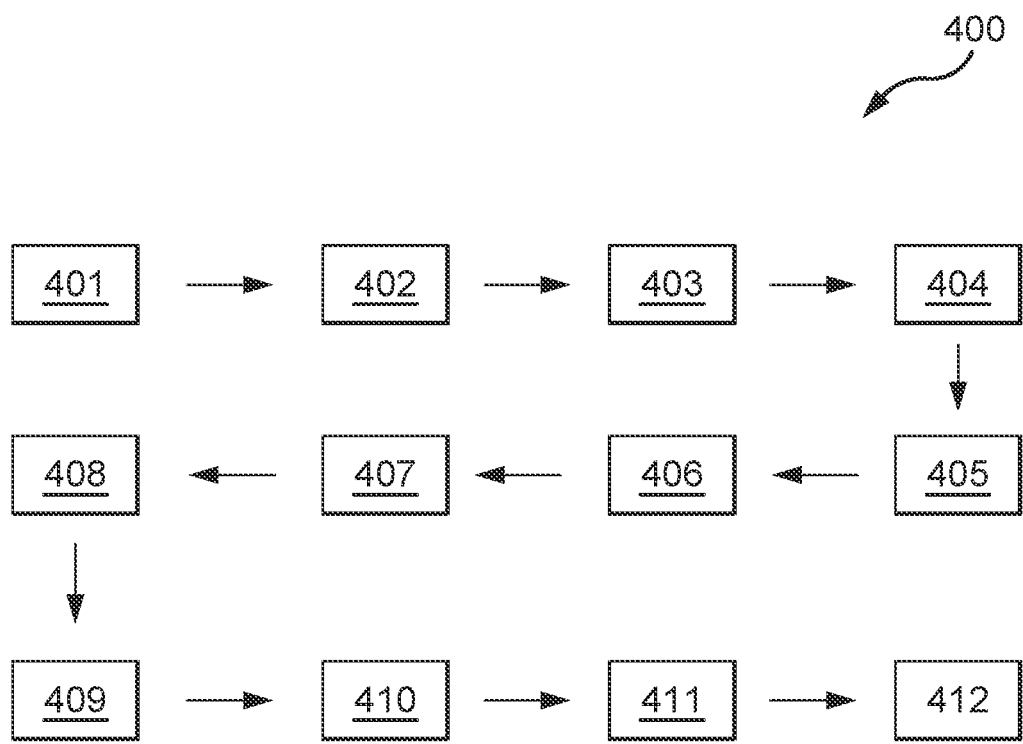
FIG. 18 is a schematic flowchart illustrating another method for installing a prefabricated wall frame assembly system.
Figure 19:
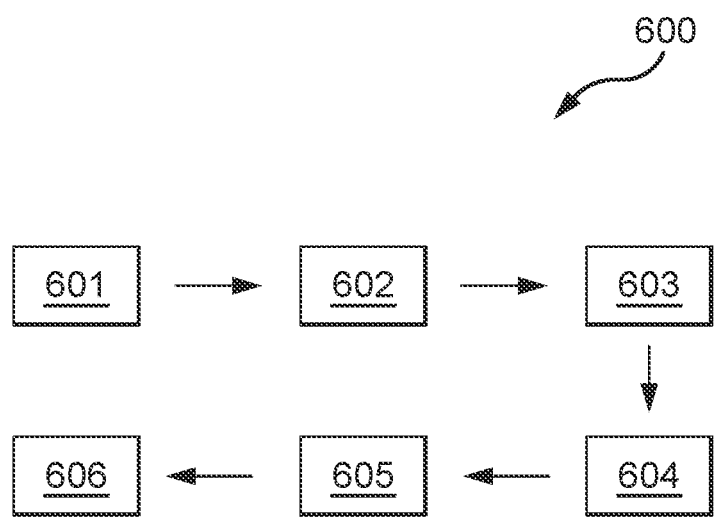
FIG. 19 is a schematic flowchart illustrating a method for constructing a prefabricated sewage assembly system.

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

It should be further noted that the use of subheadings in the following specification are to enhance readability and should not be interpreted in a limiting sense.

A. Prefabricated Wall Frame Assembly System with Telescopic Components.

As shown in in the Figures, the first preferred embodiment of the prefabricated wall frame assembly system 100 is comprised of a frame 101 and at least one structural support member 102 disposed on the frame 101, both being vertically adjustable. The at least one structural support member 102 may include horizontal and/or vertical members. Both the frame 101 and the at least one structural support member 102 are correspondingly dimensioned and configured to permit installation of the prefabricated wall frame assembly system 100 by sliding the frame 101 and the at least one structural support member 102 into an installed disposition against the ceiling 104.

The system may further include a foot member 116 configured to attach to the floor 103. For example, to facilitate installation of the preferred embodiment, the at least one structural support member 102 and the frame 101 are slid vertically upwards such the prefabricated wall frame assembly system 101 meets the ceiling 104. The system 100 is then secured. If the embodiment includes a foot member 116, the same is secured to the floor 103.

In the preferred embodiment, the frame 101 and the at least one structural support member 102 are vertically adjustable or extendable due to a telescopic modular system 100'. More specifically, a vertical portion of the frame 105 and the at least one structural support member 102 are individually comprised of a first stud 106 and a second stud 107 in the preferred embodiment. The first stud 106 and the second stud 107 are disposed in slidable relation to one another and are configured to overlap a minimum overlap distance 108. In the preferred embodiment, the minimum overlap distance 108 is at least one foot.

Further, there is nonlinear overlap of the first stud 106 and the second stud 107 comprising each of the at least one structural support member 102 and the frame 101 in the preferred embodiment. To illustrate, the first stud 106 of the vertical portion of the frame 105 has a first length 109, and the first stud 106 of the at least one structural support member 102 has a second length 110. The first length 109 and the second length 110 are unequal, and therefore do not have linear overlap relative to one another. Moreover, the second stud 107 of the vertical portion of the frame 105 has a third length 111, and the second stud 107 of the at least one structural support member 102 has a fourth length 112. The third length 111 is unequal to the fourth length 112, similarly resulting in nonlinear overlap. It is also preferred that every other of the at least one structural support member 102 first studs 106 with the same length as one another, and second studs 107 with the same lengths as one another. In other embodiments, however, the first length 109, second length 110, third length 111, and fourth length 112 may be all the same, all different, or have at least two of the same lengths. As discussed, however, in the preferred embodiment the first length 109 overlaps with the second length 110 the minimum overlap distance 108 of at least one foot, as does the third length 111 with the fourth length 112.

The prefabricated wall frame assembly system 100 may further include at least one rough-in component 113 housed by the frame 101 in the preferred embodiment. The at least one rough-in component 113 is preferably configured to facilitate mechanical, electrical, and plumbing (MEP) connections 114 to the system 100. From an electrical standpoint, the system 100 may further include a low voltage connection panel 115, which is preferably housed within the frame 101.

B. Prefabricated Wall Frame Assembly System with a Cap Member.

A second preferred embodiment of the prefabricated wall frame assembly system 100 centers around a cap member 117. This preferred embodiment comprises a frame 101, at least one structural support member 102 disposed on the frame 101, and a cap member 117 disposed in slidably fastened communication with the frame 101 via at least one aperture 118. In the preferred embodiment, the cap member 117, the frame 101, and the at least one aperture 118 are correspondingly dimensioned and configured to permit installation of the prefabricated wall frame assembly system 100 by sliding the cap member 117 into an installed disposition against the ceiling 104 of the partially complete structure. The system 100 may further include a foot member 116 configured to attach to the floor 103, securing the system 100 into an installed disposition.

The cap member 117 is structured to slide a cap distance 119 via the at least one aperture 118 in the preferred embodiment. To install this embodiment of the system 100, the cap member 117 is slid up the frame 101 to ceiling 104 height, the movement being facilitated by the at least one aperture 118 which secures the cap member 117 to the frame 101. The at least one aperture 118 is preferably oblong in shape.

Importantly, this second preferred embodiment of the system 100 (including the cap member 117) may be used independently, or in conjunction with the first preferred embodiment (the prefabricated wall frame assembly system 100 with telescopic modular system 100'). Accordingly, in another embodiment of the system 100 that includes the cap member 117, the frame 101 and the at least one structural support member 102 are configured to be vertically adjustable as well. The system 100 could therefore be used by sliding the cap member 117 into an installed disposition against ceiling 104, whether alone or in addition to adjusting the frame 101 and the at least one structural support member 102 vertically by sliding each upwards.

In this embodiment, there is nonlinear overlap of the first stud 106 and the second stud 107 comprising each of the at least one structural support member 102 and the frame 101. As detailed above, the first stud 106 of the vertical portion of the frame 105 has a first length 109, and the first stud 106 of the at least one structural support member 102 has a second length 110. The first length 109 and the second length 110 are unequal, and therefore do not have linear overlap relative to one another. Additionally, the second stud 107 of the vertical portion of the frame 105 has a third length 111, and the second stud 107 of the at least one structural support member 102 has a fourth length 112. The third length 111 is unequal to the fourth length 112, again resulting in nonlinear overlap. It is also preferred that every other of the at least one structural support member 102 first studs 106 have the same length as one another, and second studs 107 have the same lengths as one another. In other embodiments, the first length 109, second length 110, third length 111, and fourth length 112 may be all the same, all different, or have at least two of the same lengths. Nonetheless, in the preferred embodiment the first length 109 overlaps with the second length 110 the minimum overlap distance 108 of at least one foot, as does the third length 111 with the fourth length 112.

Identically to the first preferred embodiment, this second preferred embodiment may also include at least one rough-in component 113, housed by the frame 101. The at least one rough-in component 113 is preferably configured to facilitate mechanical, electrical, and plumbing (MEP) connections 114 to the system. The system 100 may further include a low voltage connection panel 115, preferably housed within the frame 101.

C. Prefabricated Wall Frame Assembly Storage and Transportation Housing System.

The present invention further relates to a prefabricated wall frame assembly storage and transportation housing system 200, comprising at least one base member 201, at least one pallet support member 202, a pallet floor 203, a plurality of pallet floor channels 204 disposed on the pallet floor 203, and a plurality of side channels 205 disposed on the at least one pallet support member 202. In addition, the prefabricated wall frame assembly storage and transportation housing system 200 is preferably in the shape of a three-dimensional rectangle or cube (when in an expanded orientation). The preferred system 200 is configured to transport and/or house at least one prefabricated wall assembly system 100 at a time, but can preferably accommodate at least as many of the same as the number of the plurality of pallet floor channels 204.

Preferably, the plurality of pallet floor channels 204 and the pallet floor 203 run parallel to the ground, whereas the plurality of side channels 205 run perpendicular to the ground. In the preferred embodiment, the at least one pallet support member 202 is defined as six vertical members disposed perpendicular to the pallet floor 203 and two horizontal members disposed parallel to the pallet floor 203. Each horizontal at least one pallet support member 202 retains a side of the prefabricated wall frame assembly system 100 in each of their respective side channels 205.

The preferred embodiment further comprises at least one hinge mechanism 206 disposed on the at least one pallet support member 202. The at least one hinge mechanism 206 is structured to enable a change in orientation of the at least one pallet support member 202, and thereby the volume of the system 200. In the preferred embodiment, the at least one hinge mechanism 206 is configured to enable each at least one pallet support 202 member to go from the expanded orientation to a collapsed or folded orientation.

Moreover, the at least one base member 201 of the system 200 is configured to receive a lifting mechanism 207, such as the forks on a forklift or tractor. The at least one base member 201 is designed to permit various different sizes of lifting mechanisms 207 to enter and lift the system 200. The preferred embodiment also has both front and lateral areas of the at least one base member 201 which the lifting mechanism 207 may enter. Further, the preferred embodiment may be lifted whether the system 200 is in expanded or collapsed orientation, and whether or not carrying prefabricated wall frame assembly systems 100.

D. Method for Installing a Prefabricated Wall Frame Assembly System with Telescopic Components.

The invention further comprises a method 300 for installing the prefabricated wall frame assembly system 100. The preferred method 300 comprises providing 301 a prefabricated wall frame assembly system 100 (including a frame 101 and at least one structural support member 102), and providing 302 a prefabricated wall frame assembly storage and transportation housing system 200 (including at least one base member 201, at least one pallet support member 202, a pallet floor 203, a plurality of pallet floor channels 204 disposed on the pallet floor 203, and a plurality of side channels 205 disposed on the at least one pallet support member 202).

The method 300 further comprises introducing 303 the prefabricated wall frame assembly system 100 to the prefabricated wall frame assembly storage and transportation housing system 200, and placing 304 each prefabricated wall frame assembly system 100 in removable communication with at least one of the plurality of pallet floor channels 204. The method 300 next comprises placing 305 the frame 101 in removable communication with at least one of the plurality of side channels 205, and transporting 306 the prefabricated wall frame assembly storage and transportation housing system 200 to a partially complete structure.

Moreover, the method 300 further comprises transporting 307 at least one prefabricated wall frame assembly system 100 into the partially complete structure through an opening therein. This may be accomplished by using a lifting mechanism 207 to lift the entire prefabricated wall frame assembly storage and transportation housing system 200 into the partially complete structure. A single prefabricated wall frame assembly system 100 or many of the same may be transported into the partially complete structure.

The preferred method further comprises positioning 308 the prefabricated wall frame assembly system 100 in a predetermined location, pivoting 309 the same about the predetermined location into an upright orientation, and securing 310 the same to the partially complete structure. The method 300 may further comprise slidably raising 311 a vertical portion of the frame 105 and the at least one structural support member 102 into an installed disposition against the ceiling 104.

Additionally, the method 300 may further include the step of providing 312 an angled platform 313 (including a frame 314, an angled support surface 315, and a plurality of feet 316), and delivering the prefabricated wall frame assembly system 100 into the partially complete structure with the angled platform 313. The angled platform 313 is preferably dimensioned and configured to fit within a balcony door opening, and receive a lifting mechanism 207.

E. Method for Installing a Prefabricated Wall Frame Assembly System with a Cap Member.

The invention further comprises a method 400 for installing the prefabricated wall frame assembly system 100 with a cap member 117. The preferred method 400 comprises providing 401 a prefabricated wall frame assembly system 100 (including a frame 101, at least one structural support member 102, and a cap member 117), and providing 402 a prefabricated wall frame assembly storage and transportation housing system 200 (including at least one base member 201, at least one pallet support member 202, a pallet floor 203, a plurality of pallet floor channels 204 disposed on the pallet floor 203, and a plurality of side channels 205 disposed on the at least one pallet support member 202).

The method 400 further comprises introducing 403 the prefabricated wall frame assembly system 100 to the prefabricated wall frame assembly storage and transportation housing system 200, and placing 404 each prefabricated wall frame assembly system 100 in removable communication with at least one of the plurality of pallet floor channels 204. The method further comprises placing 405 the frame 101 in removable communication with at least one of the plurality of side channels 205, and transporting 406 the prefabricated wall frame assembly storage and transportation housing system 200 to a partially complete structure.

Continuing on, the method 400 further comprises transporting 407 at least one prefabricated wall frame assembly system 100 into the partially complete structure through an opening therein. This may be accomplished by using a lifting mechanism 207 to lift the entire prefabricated wall frame assembly storage and transportation housing system 200 into the partially complete structure. A single prefabricated wall frame assembly system 100 or many of the same may be transported into the partially complete structure.

The method 400 further comprises positioning 408 the prefabricated wall frame assembly system 100 in a predetermined location, pivoting 409 the same about the predetermined location into an upright orientation, and securing 410 the same to the partially complete structure. The method 400 may further comprise slidably raising 411 the cap member into an installed disposition against the ceiling 104.

In addition, the method 400 may further include the step of providing 412 an angled platform 313 (including a frame 314, an angled support surface 315, and a plurality of feet 316), and delivering 413 the prefabricated wall frame assembly system 100 into the partially complete structure with the angled platform 313. The angled platform 313 is preferably dimensioned and configured to fit within a balcony door opening, and receive a lifting mechanism 207.

F. Prefabricated Sewage Assembly System.

The present invention further relates to a prefabricated sewage assembly system 500. The system 500 comprises a plurality of base members 501, a plurality of adjustable brackets 502 (each individually disposed on each of the plurality of base members 501), a plurality of slots 503 disposed on each of the plurality of adjustable brackets 502, a plurality of slot pins 504 disposed within each of the plurality of slots 503 (each configured to slide a slot distance 505 via the plurality of slots 503), and a plurality of pipe anchors 506 correspondingly dimensioned and configured to receive and permit installation of a plurality of pipes 507. Moreover, the plurality of pipes 507 comprises a network of interconnected pipes 508. The prefabricated sewage assembly system 500 is further correspondingly dimensioned and configured to permit installation within a structure. The system 500 may also be correspondingly dimensioned and configured to permit installation on a prefabricated wall frame assembly system 100, or in the floor 103 and/or ceiling of the structure, which may be complete or partially complete.

The plurality of adjustable brackets 502 are each comprised of horizontally and vertically adjustable bracket components 509 in the preferred embodiment, and permit disposal of the plurality of adjustable brackets 502 in a plurality of orientations. Further, the plurality of slots 503 are disposed in a plurality of orientations on each of the adjustable brackets 502 in the preferred embodiment. Each of the plurality of pipe anchors 506 are correspondingly dimensioned and configured to retain each of said plurality of pipes 507 in the preferred embodiment of the system 500. Overall, the prefabricated sewage assembly system 500 embodies one in which the plurality of pipes 507 and corresponding fittings are secure, high quality, and optimized.

G. Method for Constructing a Prefabricated Sewage Assembly System.

The invention is also directed to a method 600 for constructing a prefabricated sewage assembly system 500. The method 600 comprises providing 601 a plurality of base members 501, a plurality of adjustable brackets 502 disposed on the plurality of base members 501, a plurality of slots 503 disposed on each of the plurality of adjustable brackets 502, a plurality of slot pins 504 disposed within each of the plurality of slots 503, a plurality of pipe anchors 506, a plurality of pipes 507, and an assembly platform 607.

The method 600 further comprises securing 602 each of the plurality of base members 501 to predetermined locations on the assembly platform 607. Moreover, the method 600 further comprises adjusting 603 each of the plurality of adjustable brackets 502 to an optimal orientation, and sliding 604 each of the plurality of slot pins 504 within each of the plurality of slots 503 to an optimal slot pin location 510 (to secure each of the plurality of adjustable brackets 502). The method 600 further comprises providing and securing 605 each of the plurality of pipes 507 to each of the plurality of pipe anchors 506, and connecting and securing 606 the plurality of pipes to one another.

All of the foregoing and other objects, features and advantages of the present invention will become clearer when the drawings as well as the detailed description are taken into consideration.

What is claimed is:

1. A method for constructing a prefabricated sewage assembly system, comprising:
   providing a plurality of base members, a plurality of adjustable brackets disposed on the plurality of base members, a plurality of slots disposed on each of the adjustable brackets, the plurality of slots being elongated and extending a slot distance, a plurality of slot pins disposed within each of the slots, wherein the plurality of slot pins are configured to slide along the slot distance of the plurality of slots to adjust a height of at least one of the plurality of adjustable brackets, a plurality of pipe anchors, a plurality of pipes, and an assembly platform;
   securing each of the plurality of base members to predetermined locations on the assembly platform;
   adjusting each of the adjustable brackets to an optimal bracket orientation;
   sliding each of the plurality of slot pins within each of the plurality of slots to an optimal slot pin location;
   providing and securing each of the plurality of pipes to each of the plurality of pipe anchors; and
   connecting and securing the plurality of pipes to one another.

* * * * *